United States Patent
Veitsel et al.

(10) Patent No.: US 9,618,626 B2
(45) Date of Patent: Apr. 11, 2017

(54) COMMON COORDINATE-QUARTZ LOOP FOR REDUCING THE IMPACT OF SHOCK AND VIBRATION ON GLOBAL NAVIGATION SATELLITE SYSTEM MEASUREMENTS

(71) Applicant: Topcon Positioning Systems Inc., Livermore, CA (US)

(72) Inventors: Andrey Vladimirovich Veitsel, Moscow (RU); Mark Isaakovich Zhodzishsky, Moscow (RU); Vladimir Victorovich Beloglazov, Moscow (RU); Dmitry Pavlovich Nikitin, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 479 days.

(21) Appl. No.: 14/357,421

(22) PCT Filed: Apr. 11, 2013

(86) PCT No.: PCT/RU2013/000311
§ 371 (c)(1),
(2) Date: May 9, 2014

(87) PCT Pub. No.: WO2014/168504
PCT Pub. Date: Oct. 16, 2014

(65) Prior Publication Data
US 2015/0015439 A1    Jan. 15, 2015

(51) Int. Cl.
*G01S 19/24*    (2010.01)
*G01S 19/37*    (2010.01)
*G01S 19/23*    (2010.01)

(52) U.S. Cl.
CPC ............ *G01S 19/37* (2013.01); *G01S 19/235* (2013.01); *G01S 19/24* (2013.01)

(58) Field of Classification Search
CPC ......... G01S 19/37; G01S 19/235; G01S 19/24
(Continued)

(56) References Cited

U.S. PATENT DOCUMENTS 6,313,789 B1    11/2001    Zhodzishsky et al.
6,441,780 B1 *    8/2002    Rog ........................ G01S 19/22
                                                                342/357.61
(Continued)

FOREIGN PATENT DOCUMENTS

EP    1512985 A2    3/2005
RU    2197064 C2    1/2003
(Continued)

OTHER PUBLICATIONS

International Search Report and Written Opinion issued on Feb. 6, 2014, for the corresponding international patent application No. PCT/RU2013/000311, 7 pp.
(Continued)

*Primary Examiner* — Frank J McGue
(74) *Attorney, Agent, or Firm* — Chiesa Shahinian & Giantomasi PC

(57) ABSTRACT

A navigation receiver operably coupled to an antenna can determine location by receiving and processing radiofrequency navigation signals from global navigation satellites. The navigation receiver includes a quartz crystal oscillator that serves as a reference frequency source for a local oscillator signal that is mixed with the radiofrequency navigation signals to generate intermediate signals at intermediate frequencies lower than the radiofrequencies.
In particular applications, the quartz crystal oscillator and the antenna are subjected to vibration and shock.
A shift in the frequency or phase of the intermediate signals can result, and performance of phase-lock loops can degrade.

(Continued)

Performance is improved with a phase-lock loop that processes a combination of individual channel control signals and common control signals.

The common control signals are generated by a common coordinate-quartz loop discriminator that processes signals generated from the entire group of navigation signals received by the navigation receiver.

16 Claims, 12 Drawing Sheets

(58) Field of Classification Search
USPC .................................................. 342/357.63
See application file for complete search history.

(56) References Cited

U.S. PATENT DOCUMENTS

| | | | |
|---|---|---|---|
| 7,222,035 | B1 | 5/2007 | Zhodzishsky et al. |
| 7,394,546 | B2 | 7/2008 | Vakhtin et al. |
| 7,522,099 | B2 | 4/2009 | Zhodzishsky et al. |
| 7,573,337 | B2 | 8/2009 | Wang et al. |
| 8,618,981 | B2 | 12/2013 | Zhodzishsky et al. |
| 2007/0052583 | A1 | 3/2007 | Zhodzishsky et al. |
| 2011/0181467 | A1* | 7/2011 | Samavati ............... G01S 19/33 342/357.73 |

FOREIGN PATENT DOCUMENTS

| | | |
|---|---|---|
| RU | 47604 U1 | 8/2005 |
| RU | 2382491 C1 | 2/2010 |
| WO | 2010074605 A1 | 7/2010 |

OTHER PUBLICATIONS

International Search Report mailed on Mar. 25, 2010, in connection with International Patent Application No. PCT/RU2009/000677, 1 page.

* cited by examiner

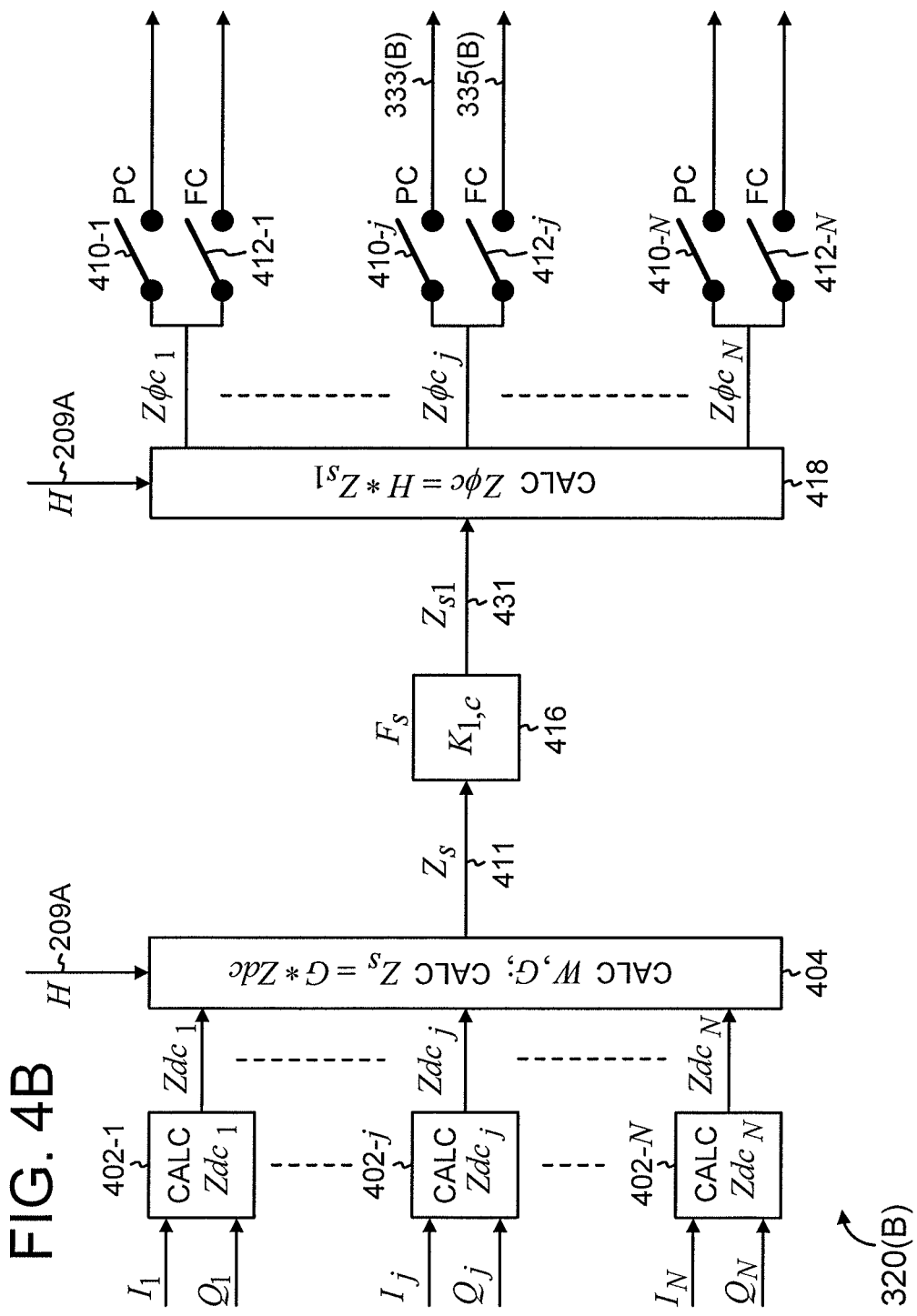

COMMON COORDINATE-QUARTZ LOOP FOR REDUCING THE IMPACT OF SHOCK AND VIBRATION ON GLOBAL NAVIGATION SATELLITE SYSTEM MEASUREMENTS

BACKGROUND OF THE INVENTION

The present invention relates generally to global navigation satellite systems, and more particularly to method and apparatus for reducing the impact of shock and vibration on global navigation satellite system measurements.

Global navigation satellite systems (GNSSs) can determine locations with high accuracy. Currently deployed global navigation satellite systems are the United States Global Positioning System (GPS) and the Russian GLO-NASS. Other global navigation satellite systems, such as the European GALILEO system, are under development. In a GNSS, a navigation receiver receives and processes radio signals transmitted by satellites located within a line-of-sight of the receiver. The satellite signals comprise carrier signals modulated by pseudo-random binary codes. The receiver measures the time delays of the received signals relative to a local reference clock or oscillator. Code measurements enable the receiver to determine the pseudo-ranges between the receiver and the satellites. The pseudo-ranges differ from the actual ranges (distances) between the receiver and the satellites due to various error sources and due to variations in the time scales of the satellites and the receiver. If signals are received from a sufficiently large number of satellites, then the measured pseudo-ranges can be processed to determine the code coordinates and coordinate time scales at the receiver. This operational mode is referred to as a stand-alone mode, since the measurements are determined by a single receiver. A stand-alone system typically provides meter-level accuracy.

To improve the accuracy, precision, stability, and reliability of measurements, differential navigation (DN) systems have been developed. In a DN system, the position of a user is determined relative to a base station, also referred to as a base. The base is typically fixed, and the coordinates of the base are precisely known; for example, by surveying. The base contains a navigation receiver that receives satellite signals and that can determine the coordinates of the base by GNSS measurements.

The user, whose position is to be determined, can be stationary or mobile; in a DN system, the user is often referred to as a rover. The rover also contains a navigation receiver that receives satellite signals. Signal measurements processed at the base are transmitted to the rover via a communications link. To accommodate a mobile rover, the communications link is often a wireless link. The rover processes the measurements received from the base, along with measurements taken with its own receiver, to improve the accuracy of determining its position. Accuracy is improved in the differential navigation mode because errors incurred by the receiver at the rover and by the receiver at the base are highly correlated. Since the coordinates of the base are accurately known, measurements from the base can be used to compensate for the errors at the rover. A differential global positioning system (DGPS) computes locations based on pseudo-ranges only.

The location determination accuracy of a differential navigation system can be further improved by supplementing the code pseudo-range measurements with measurements of the phases of the satellite carrier signals. If the carrier phases of the signals transmitted by the same satellite are measured by both the navigation receiver in the base and the navigation receiver in the rover, processing the two sets of carrier phase measurements can yield a location determination accuracy to within several percent of the carrier's wavelength. A differential navigation system that computes locations based on real-time carrier signals, in addition to the code pseudo-ranges, is often referred to as a real-time kinematic (RTK) system. Processing carrier phase measurements to determine coordinates includes the step of ambiguity resolution; that is, determining the integer number of cycles in the carrier signal received by the navigation receiver from an individual satellite.

Global navigation satellite systems have been used for control of construction vehicles, such as bulldozers: an antenna and a receiver are mounted on the vehicle. During operation of the construction vehicle, the antenna and the receiver can be subjected to shock and vibration, which can disturb the GNSS measurements and decrease the accuracy of the coordinate measurements. Method and apparatus for reducing the impact of shock and vibration on GNSS measurements would be advantageous.

BRIEF SUMMARY OF THE INVENTION

Disclosed are a method and an apparatus for improving the performance of a navigation receiver operably coupled to an antenna, in which the navigation receiver and the antenna are subjected to vibration and shock.

The navigation receiver receives a group of navigation signals. Each individual navigation signal in the group of navigation signals corresponds to an individual global navigation satellite in a group of global navigation satellites, and each individual navigation signal in the group of navigation signals has a corresponding radiofrequency. A local oscillator generates a local oscillator signal having a local oscillator frequency; the local oscillator signal is based on the quartz crystal oscillator signal, and the local oscillator frequency is based on the quartz crystal oscillator frequency. A group of intermediate signals based on the group of navigation signals and based on the local oscillator signal is generated. Each individual intermediate signal in the group of intermediate signals corresponds to an individual navigation signal in the group of navigation signals, and each individual intermediate signal in the group of intermediate signals has a corresponding intermediate frequency based on a difference between the corresponding radiofrequency and the local oscillator frequency.

A group of sequences of digital signals is generated. Each individual sequence of digital signals in the group of sequences of digital signals corresponds to a digital representation of an individual intermediate signal in the group of intermediate signals. For each individual sequence of digital signals in the group of sequences of digital signals, a phase of the individual sequence of digital signals is tracked with an individual channel phase-lock loop. Tracking is performed by the following steps.

An individual channel correlator, operating at a first clock frequency, generates a sequence of in-phase correlation signals and a sequence of quadrature-phase correlation signals; the sequence of in-phase correlation signals and the sequence of quadrature-phase correlation signals are based on the sequence of individual digital signals and based on a sequence of individual channel reference signals received from an individual channel numerically-controlled oscillator. A common coordinate-quartz loop discriminator, operating at a second clock frequency, generates a sequence of common control signals. An individual channel accumulator, operating at a third clock frequency, generates a sequence of accumulated in-phase correlation signals and a sequence of accumulated quadrature-phase correlation signals; the sequence of accumulated in-phase correlation signals is based on the sequence of in-phase correlation signals, and the sequence of accumulated quadrature-phase correlation signals is based on the sequence of quadrature-phase correlation signals.

An individual channel discriminator, operating at the third clock frequency, generates a sequence of phase-lock loop tracking error signals based on the sequence of accumulated in-phase correlation signals and based on the sequence of accumulated quadrature-phase correlation signals. An individual channel loop filter, operating at the third clock frequency, generates a sequence of individual channel control signals. The individual channel numerically-controlled oscillator, operating at a fourth clock frequency, generates the sequence of individual channel reference signals; the sequence of individual channel reference signals is based on the sequence of common control signals and based on the sequence of individual channel control signals. The individual channel numerically-controlled oscillator transmits the sequence of individual channel reference signals to the individual channel correlator.

The sequence of common control signals can be (a) a sequence of common phase-control signals based on the sequences of in-phase correlation signals and the sequences of quadrature-phase correlation signals generated for all of the sequences of digital signals in the group of sequences of digital signals; (b) a sequence of common frequency-control signals based on the sequences of in-phase correlation signals and the sequences of quadrature-phase correlation signals generated for all of the sequences of digital signals in the group of sequences of digital signals; or (c) a sequence of common phase-control signals and a sequence of common frequency-control signals, in which the sequence of common phase-control signals and the sequence of common frequency-control signals are based on the sequences of in-phase correlation signals and the sequences of quadrature-phase correlation signals generated for all of the sequences of digital signals in the group of sequences of digital signals.

The sequence of individual channel control signals can be (a) a sequence of individual channel frequency-control signals based on the sequence of phase-lock loop tracking error signals; (b) a sequence of individual channel frequency-control signals and a sequence of individual channel phase-control signals, in which the sequence of individual channel frequency-control signals and the sequence of individual channel phase-control signals are based on the sequence of phase-lock loop tracking error signals; (c) a sequence of individual channel frequency-control signals based on the sequence of phase-lock loop tracking error signals and based on the sequence of common phase-control signals; or (d) a sequence of individual channel frequency-control signals and a sequence of individual channel phase-control signals, in which the sequence of individual channel frequency-control signals is based on the sequence of phase-lock loop tracking error signals and based on the sequence of common phase-control signals and in which the sequence of individual channel phase-control signals is based on the sequence of phase-lock loop tracking error signals.

These and other advantages of the invention will be apparent to those of ordinary skill in the art by reference to the following detailed description and the accompanying drawings.

BRIEF DESCRIPTION OF THE DRAWINGS

FIG. 4B shows a schematic functional block diagram of a second embodiment of a discriminator for a common coordinate-quartz loop;

DETAILED DESCRIPTION

Figure 1:
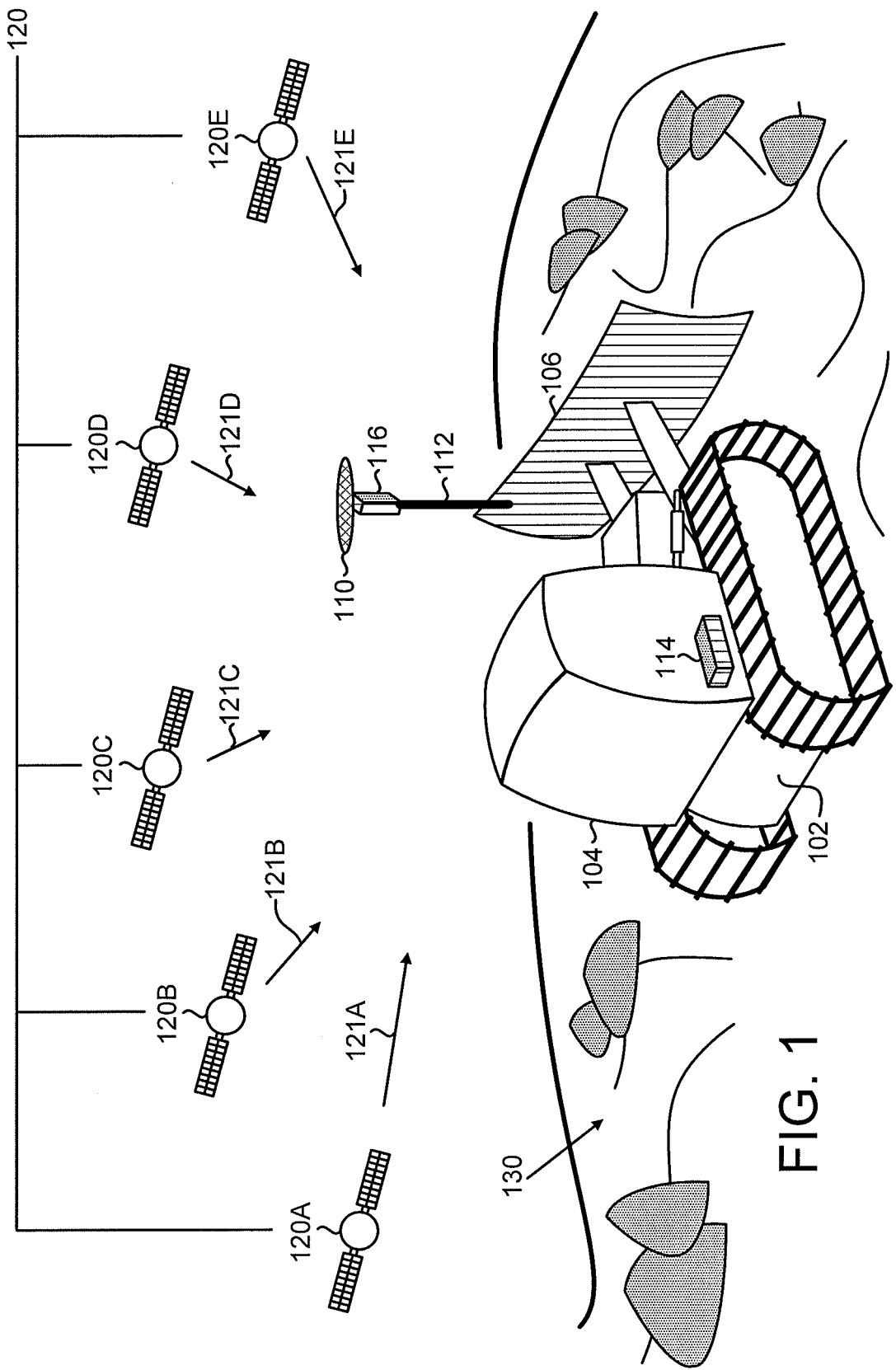
FIG. 1 shows an example of a global navigation satellite system.

FIG. 1 shows a high-level schematic of a global navigation satellite system (GNSS). The GNSS is used to determine, for example, the three-dimensional coordinates of the rover 102 travelling along the ground surface 130; in this example, the rover is a construction vehicle—in particular, a bulldozer. A constellation of global navigation satellites 120 transmits navigation signals. Shown are five representative navigation satellites, denoted navigation satellite 120A, navigation satellite 120B, navigation satellite 120C, navigation satellite 120D, and navigation satellite 120E.

Refer to the rover 102. In this example, the antenna 110 and the navigation receiver 116 are mounted on the blade 106 via the mast 112; therefore, the antenna 110 and the navigation receiver 116 can be used to determine the three-dimensional coordinates of the blade 106. Navigation signals received by the antenna 110 are processed by the navigation receiver 116, which transmits measurements via a signal cable (not shown) or via a wireless link to a control unit 114, typically mounted inside the cab 104. In the example shown, navigation signal 121A, navigation signal 121B, navigation signal 121C, navigation signal 121D, and navigation signal 121E are received by the antenna 110 from navigation satellite 120A—navigation satellite 120E, respectively.

Both the antenna and the navigation receiver can be subjected to shock and vibration. The engine powering the rover 102 (typically a heavy-duty diesel engine for a bulldozer) can be a source of vibration. Shock and vibration can arise from movement of the rover 102 over rough terrain, and earthmoving operations with the blade 106 can subject the antenna 110 and the navigation receiver 116 to severe shock and vibration. Shock and vibration can degrade GNSS measurements; details are discussed below. Embodiments of the invention described herein reduce the impact of shock and vibration on GNSS measurements.

Each satellite in a global navigation satellite system can transmit signals on one or more frequency bands (for example, on the L1 and L2 frequency bands). A signal transmitted by a specific satellite on a specific frequency band corresponds to a specific satellite channel. Satellite channels are processed in a navigation receiver as described below. To simplify the discussion, processing of signals for a single frequency band is described; however, embodiments of the invention can be implemented for multiple frequency bands.

Figure 2:
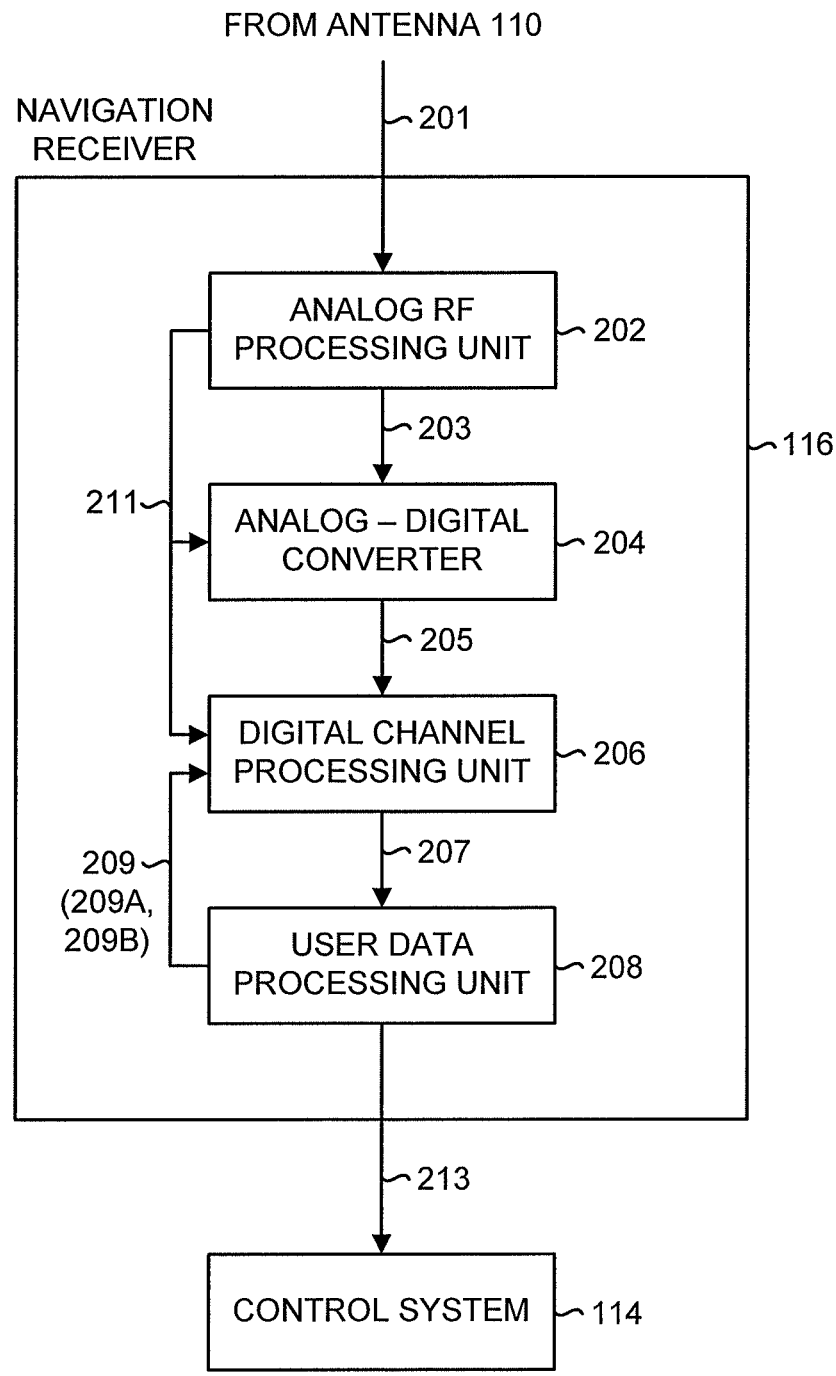
FIG. 2 shows a schematic functional block diagram of a navigation receiver.

FIG. 2 shows a high-level schematic functional block diagram of the navigation receiver 116. The received signal 201 represents the total signal (also referred to as the combined signal, aggregate signal, or composite signal) received by the antenna 110. For the example shown in FIG. 1, the received signal 201 includes the navigation signal 121A—navigation signal 121E. The received signal 201 is first inputted into the analog radiofrequency (RF) processing unit 202, details of which are described below. The output analog signal 203 is inputted into the analog-digital converter (ADC) 204, which digitizes the analog signal 203. The output digital signal 205 is then inputted into the digital channel processing unit 206, which processes navigation data such as phase measurements, code measurements, and information symbols used for solving navigation tasks. The output digital signal 207 is inputted into the user data processing unit 208, which processes user data such as coordinates and velocity of the rover. The output digital signal 213 is inputted, for example, into the control system 114 (FIG. 1). The control system 114, which can also receive signals from other sensors mounted on the dozer body or the blade 106, can be used to control the elevation and orientation of the blade 106. The user data processing unit 208 also calculates the output 209 which is fed back to the digital channel processing unit 206. The output 209 is described below.

Figure 7:
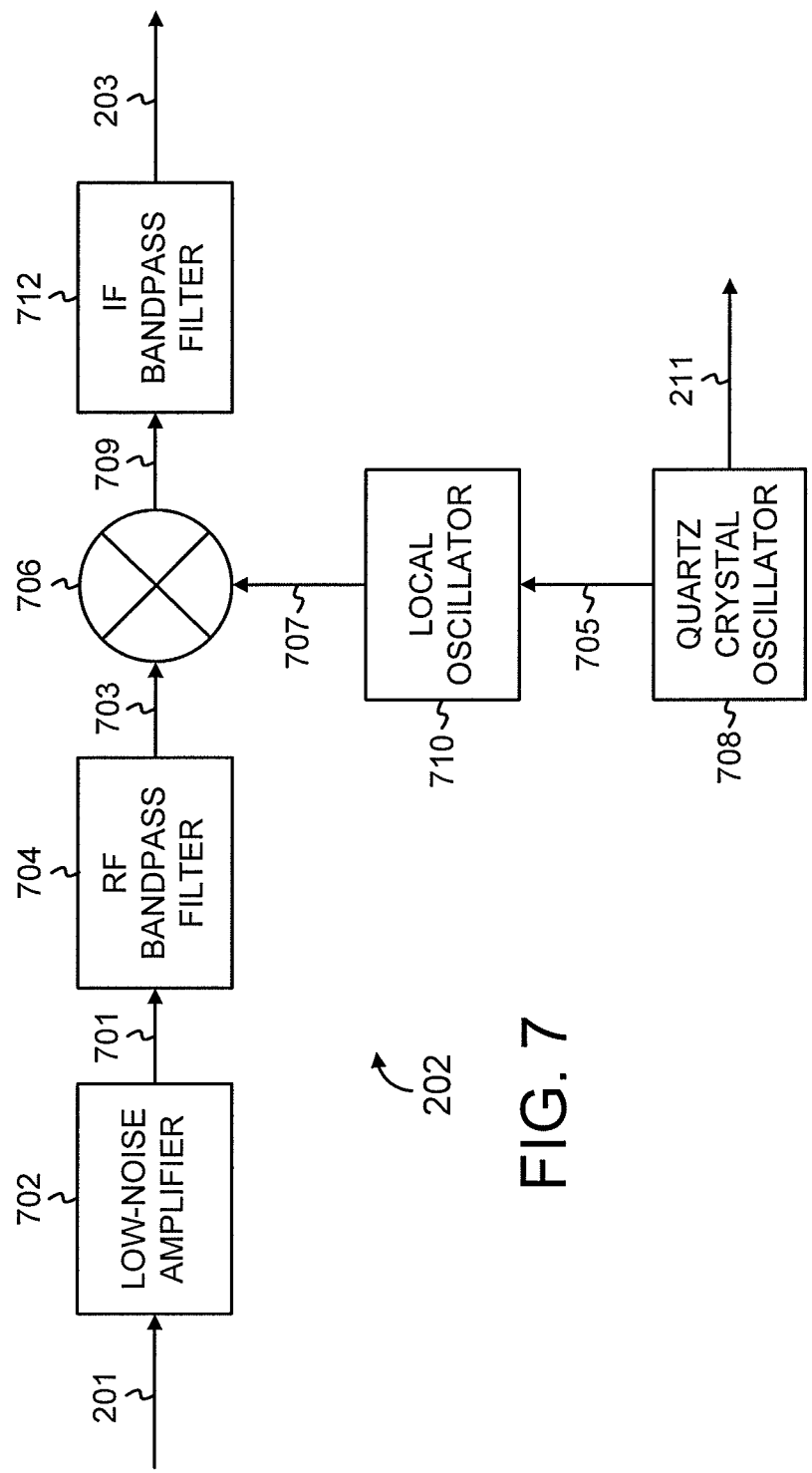
FIG. 7 shows a schematic functional block diagram of an analog radiofrequency processing unit.

Analog RF processing units of varying complexity are well-known in the art. FIG. 7 shows a high-level functional schematic of a simplified example of the analog RF processing unit 202. The received signal 201 (FIG. 2) is inputted into the low-noise amplifier (LNA) 702. The amplified output signal 701 is inputted into the RF bandpass filter 704. The filtered RF signal 703, with frequency $f_{RF}$, is inputted into the RF mixer 706. The quartz crystal oscillator (QCO) 708 generates the QCO reference signal 705 with frequency $f_q$. The QCO reference signal 705 is inputted into the local oscillator 710, which generates the local oscillator (LO) signal 707 with frequency $f_{LO}$. The value and stability of the frequency $f_{LO}$ depends on the value and stability of the frequency $f_q$. If the frequency $f_q$, varies, then there is a correlated variation in the frequency $f_{LO}$. The local oscillator signal 707 is inputted into the RF mixer 706.

The output signal 709 from the RF mixer 706 comprises signals at the two heterodyne frequencies $(f_{RF}+f_{LO})$ and $(f_{RF}-f_{LO})$. The output signal 709 is inputted into the intermediate frequency (IF) bandpass filter 712, which rejects the signal at the upconverted frequency $(f_{RF}+f_{LO})$ and passes the signal at the downconverted frequency $(f_{RF}-f_{LO})$. The output signal 203 is the downconverted analog signal with an intermediate frequency (IF) $f_{IF}=(f_{RF}-f_{LO})$ that is lower than the RF frequency of the received signal 201. The output signal 203 is transmitted to the analog-digital converter 204 (FIG. 2) for further processing. The QCO 708 also transmits the QCO reference signal 211 to the digital channel processing unit 206 and the analog-digital converter 204 (FIG. 2). The QCO reference signal 211 serves as a precision timing (clock) signal.

In some GNSSs, such as GPS, within a single frequency band (such as L1), all the satellites transmit on the same carrier frequency (the value of $f_{RF}$ is the same for all carrier signals). The navigation signal from a specific satellite can be identified by a unique pseudo-random number code. In other GNSSs, such as GLONASS, within a single frequency band (such as L1), each satellite transmits on a different carrier frequency (the value of $f_{RF}$ is different for each satellite). The navigation signal from a specific satellite can be identified by a unique carrier frequency. To simplify the discussion, in the description below, all the carrier signals have the same carrier frequency. With proper transformation of variables, however, the embodiments described below can be adapted for a GNSS in which each carrier signal has a different carrier frequency.

A set of functional steps can be grouped into user-specified functional blocks and functional sub-blocks. Herein, a module refers to a user-specified set of hardware, firmware, and software that implements (executes) a user-specified set of functional steps. The same set of functional steps can be implemented by different user-specified modules; that is, different combinations of hardware, firmware, and software.

Processing steps that require high-speed execution are typically performed by hard-wired circuits; for example, application-specific integrated circuits (ASICs) and field-programmable gate arrays (FPGAs) and firmware.

In processing each satellite channel, two tracking systems track changes in parameters of the received signal. The first tracking system, referred to as the delay-lock loop (DLL), tracks changes in the pseudo-random number (PRN) modulation code delay of the received signal. The second tracking system, referred to as the phase-lock loop (PLL), tracks changes in the carrier phase of the received signal.

In a tracking system, the input signal is multiplied by different reference signals generated in the navigation receiver, and the multiplication products are accumulated. Devices that perform multiplication are referred to as multipliers. Devices that perform several combinations of multiplications are referred to as combined multipliers. Devices that perform accumulation are referred to as accumulators or counters. Devices that perform multiplication followed by accumulation are referred to as correlators. The output of a correlator is the cross-correlation function of the input signal and the reference signal; for simplicity, the output is referred to as the correlation signal.

A specific satellite channel is typically processed via three parallel processing paths. The first path calculates the in-phase correlation signal I. This signal is obtained when the reference signal in the correlator is in-phase relative to the incoming signal carrier. The reference code in the reference signal is a replica of the PRN code modulating the incoming signal. The output of this correlator (correlator-I) is the in-phase correlation signal I.

The phase of the reference signal can differ from that of the carrier phase of the incoming signal; similarly, the reference code delay can differ from the modulation code delay of the incoming signal. If the phase shift between the phase of the reference carrier and the phase of the incoming carrier is denoted as $\phi$, and the time shift between the code delay time of the reference code and the code delay time of the incoming signal is denoted as $\tau$, then the in-phase correlation signal I can be approximated by:

$$I=k \cdot U_S \cdot \mu \cdot R_o(\tau) \cdot \cos(\phi)+I_{in}, \quad (E1)$$

where:
$R_o(\tau)$ is the normalized cross-correlation function of the incoming PRN code after filtering in the analog RF processing unit and a reference code which is a locally generated copy of the PRN code modulating the incoming signal;

$U_S$ is the amplitude of the incoming signal;

$\mu=\pm 1$ is a binary information symbol modulating the incoming signal;

k is a proportionality coefficient; and $I_{in}$ is the interference at the output of correlator-I caused by additive interference at the receiver input.

[To simplify the notation, the satellite channel index (see below) is omitted in (E1)-(E5).]

The second correlator (correlator-Q) calculates the quadrature correlation signal Q. This signal is obtained when the second reference carrier is shifted by $\tau/2$ from the first reference carrier. The reference code is the same as the one in the first correlator (correlator-I). The quadrature correlation signal Q formed at the output of correlator-Q can be approximated by:

$$Q=k \cdot U_S \cdot \mu \cdot R_o(\tau) \cdot \sin(\phi)+Q_{in}, \tag{E2}$$

where $Q_{in}$ is the interference at the output of correlator-Q caused by additive interference at the receiver input.

The third correlator (correlator-dI) calculates the code correlation signal dI that is used to generate an error signal to control the system tracking modulation code delays (DLL). To obtain this signal, the first reference carrier, in-phase with the input carrier, and a reference code that consists of a sequence of short strobe pulses (strobe sequence) are used. Strobe pulses correspond to the changes of sign of input PRN-code elements (chips). Note that the sign of a strobe pulse matches the sign of a chip which follows the strobe pulse. The code correlation signal dI can be approximated by:

$$dI=k \cdot U_S \cdot \mu \cdot \Delta R_o(\tau) \cdot \cos(\phi)+dI_{in}, \tag{E3}$$

where $\Delta R_o(\tau)$ is the cross-correlation function of the incoming PRN code after filtering in the analog RF processing unit and the reference code generated in the form of a sequence of short strobe pulses, and $dI_{in}$ is the interference at the output of correlator-dI caused by the additive interference at the receiver input.

During receiver operation, values in expressions (E1)-(E3) change over time, and the corresponding correlation signals change respectively. Correlation signals I, Q, and dI are used for coordinating (co-working) the PLL and DLL tracking systems.

Expressions (E1)-(E3) hold under the condition that PLL errors $\phi$ and DLL errors $\tau$ remain practically the same over the time (duration) of accumulating in correlators. In tracking mode, this condition is true to an adequate accuracy. In addition, in tracking mode, values $\phi$ and $\tau$ are small, and $R_o(\tau) \cdot \cos(\phi) \cong 1$. From (E1), it follows that the in-phase correlation signal I produces a binary information symbol sequence $\mu=\pm 1$. These symbols convey messages from the navigation satellites to the navigation receiver. The messages include satellite data on satellite coordinates, expected parameters of signal propagation, and other information that is used for coordinate determination.

The PLL and DLL digital tracking systems are implemented by closed circuits comprising four main components: correlator, discriminator, loop filter, and numerically-controlled oscillator (NCO). Depending on the purpose and type of the tracking system (PLL or DLL), these tracking systems use the I, Q, or dI correlation signals in different combinations. The correlators include combined multipliers that multiply the incoming signal by corresponding reference signals and accumulators that accumulate corresponding multiplication products over a specified time interval. Combined multipliers multiply the incoming signal by an in-phase reference carrier and reference code, by a quadrature-phase reference carrier and reference code, and by an in-phase reference carrier and reference strobe.

A typical PLL discriminator forms an error signal Zd according to the algorithm:

$$Zd=\arctan(Q/I). \tag{E4}$$

From (E1), (E2), and (E4), error signal Zd is proportional to error $\phi$ within $\pm \pi/2$, and then it periodically repeats. The mean value of $Zd(\phi)$ forms the PLL discriminator characteristic. The error signal is inputted to the loop filter, which in turn outputs a control signal and closes the PLL circuit, thereby controlling the frequency and phase of the PLL reference signal carrier NCO (also referred to as the carrier NCO). The carrier NCO produces reference signals for correlator-I and correlator-Q.

The DLL circuit operates in a similar way and includes similar components. The DLL discriminator forms tracking error signal Vd using the algorithm:

$$Vd=dI/I. \tag{E5}$$

The DLL reference signal code and strobe NCO (also referred to as the code and strobe NCO) generates two reference signals (reference oscillations) for the correlator-dI: one oscillation (code reference signal or code reference oscillation) in the form of a modulation code replica (or code sequence) to generate the in-phase correlation signal I, and the other (strobe reference signal or strobe reference oscillation) in the form of a strobe sequence which is sent to correlator-dI.

Discriminators operating according to expressions (E4) and (E5) can be modified if the in-phase correlation signal I is subjected to a preliminary smoothing process to reduce the interference component $I_{in}$. Smoothing the in-phase correlation signal I increases the operational stability of the tracking loops at low signal-to-noise ratios.

The PLL tracking system tries to make the tracking error $\phi$ equal to zero. As a result, one of the reference signals generated by the carrier NCO will be in-phase with the incoming signal, and its phase can be used to estimate the carrier phase of the incoming signal. This estimate is referred to as a phase measurement of the receiver.

The DLL tracking system tries to reduce the tracking error $\tau$ to zero. As a result, reference signals generated by the code and strobe NCO will correspond to the modulation code of the incoming signal. Delays of these reference signals can be used to estimate modulation code time delay of the incoming signal. This estimate is referred to as a code measurement of the receiver.

Phase and code measurements obtained from signals from a number of satellites are used to determine, for example, coordinates and speed of the rover. Due to external effects on tracking systems, the tracking errors fluctuate close to steady balance points in which error signals are equal to zero. At normal conditions in tracking modes, these errors are negligible. One source of tracking errors is the inertia of the tracking system. External disturbances (such as radio interference) are another source of tracking errors. Both types of errors depend on the inertia of the tracking system. In the tracking mode, the inertia can be estimated by the bandwidth of the equivalent filter, operation of which is equivalent to the corresponding tracking circuit (loop). The bandwidth of this filter characterizes the inertia of the tracking system and its filtering parameters. The bandwidth should be chosen based on a trade off between dynamic and interference errors.

Normal errors, such as caused by low-level noise, are accommodated during normal operation of the tracking systems; normal errors determine the accuracy of the measurements. Abnormal errors disrupt the normal operation of the tracking systems and can lead to corruption or loss of measurements. Abnormal errors can result from strong radio interference and strong multipath signals. Abnormal errors can also result from dynamic disturbances, such as shock and vibration, on the antenna and receiver. A particular type of abnormal phase error is a sudden change in the phase of the PLL carrier frequency (cycle slip). For a cycle slip of a short duration, the PLL transfers to a new stable point, and tracking continues; however, an abnormal error corresponding to an integer number of half cycles remains in the measurement of full phases. For a cycle slip of a long duration, or for a series of short-duration cycle slips, PLL tracking can be lost, and the tracking system needs to re-enter a search mode.

Embodiments of the invention disclosed herein reduce the impact of shock and vibration on measurements. Shock and vibration affect both the antenna and the quartz crystal oscillator in the receiver; however, mechanical forces have significantly different effects on the operation of the antenna and the quartz crystal oscillator.

Mechanical forces applied to the antenna cause displacements of the antenna and, consequently, phase shifts of the carrier signals received by the antenna. For a carrier signal transmitted from a specific satellite, the phase shift is proportional to the projection of the displacement of the antenna onto the radius vector between the rover and the specific satellite; that is, the phase shift depends on the specific satellite channel. As described in more detail below, the amplitude of the phase shift is proportional to the amplitude of the antenna oscillations (vibrations) and is not dependent on the frequency of the antenna oscillations. Derivatives (with respect to time) of the antenna oscillations depend on both the amplitude and frequency of the antenna oscillations. The derivatives of the antenna oscillations whose order is equal to or greater than the order of astaticism of the tracking system cause dynamic tracking errors and, in some cases, can result in cycle slips and interruptions in tracking for one or more satellite channels. But even if there is no tracking loss, dynamic errors are different for different satellite channels and can affect estimates of the rover coordinates.

As discussed above, the navigation receiver includes a quartz crystal oscillator (QCO) 708 (FIG. 2) that serves as both a reference frequency source and a reference time source (clock). Mechanical forces applied to the quartz crystal oscillator result in both a local oscillator frequency shift and a receiver clock offset, which are inter-related. Slight mechanical oscillations of the quartz crystal oscillator cause errors in the measurement of time delays; however, the resulting errors in the measurement of the coordinates are not significant, since receiver clock offsets are corrected in solving the navigation task.

The local oscillator frequency shifts are tracked by the PLL. Large amplitude mechanical oscillations, however, can disrupt the tracking operation. As rule, the PLL is used as a guiding tracking loop, and the DLL is used as a guided tracking loop. Consequently, the PLL normally has second order and generates frequency guiding indications (target designations) for the DLL. Thus the DLL is free from dynamic loads, and its order can be reduced up to the first order. The PLL has more stable tracking characteristics compared to the DLL; but if there is a loss of tracking in the PLL, there is a loss of tracking in the DLL as well.

As mentioned above, mechanical forces applied to the quartz crystal oscillator cause a shift of the local oscillator frequency $f_{LO}$ and, consequently, a shift of the intermediate frequencies of the satellite channels and their phases; the resulting phase errors are common to all the satellite channels. As discussed above, the signal of the intermediate frequency is generated as a difference of the input signal and the local oscillator signal. In the intermediate signal, therefore, there are both phase offsets caused by vibration of the antenna and phase offsets caused by vibration of the quartz crystal oscillator. To simplify the analysis, phase offsets of the intermediate signal can be treated as equivalent phase offsets of the input signal.

Consider the effects of a harmonic mechanical vibration when the antenna is mounted on the receiver case; the harmonic mechanical vibration is assumed to be identical for both the antenna and the quartz crystal oscillator. Consider the component of the mechanical vibration projected onto the radius vector between the rover and a specific satellite. The displacement of the receiver due to harmonic vibration can be represented by $$A_v = A_0 \sin(2\pi f_v t) = A_0 \sin(\omega_v t), \quad (E6)$$

where $A_v$ is the displacement (of the projected component), $A_0$ is the amplitude of vibration (of the projected component), $f_v$ is the frequency of vibration, $\omega_v = 2\pi f_v$ is the angular frequency of vibration, and t is time. The speed of vibration is given by the first derivative with respect to time:

$$A'_v = \omega_v A_0 \cos(\omega_v t); \quad (E7)$$

and the acceleration of vibration is given by the second derivative with respect to time:

$$A''_v = -\omega_v^2 A_0 \sin(\omega_v t). \quad (E8)$$

To simplify the calculation, ignore the frequency change in the input signal due to satellite movement. The equivalent perturbed frequency of the input signal, when both the antenna and the quartz crystal oscillator are subjected to the same vibration, can then be expressed as $$f_{in} = f_0 + \Delta f_a + \Delta f_q, \quad (E9)$$

where:
$f_{in}$ is the equivalent perturbed frequency of the input signal;
$f_0$ is the nominal (unperturbed) frequency of the input signal (for the GPS C/A channel, for example, $f_0 = 1575.42$ MHz);
$\Delta f_a$ is the frequency change of the input signal due to the effects of vibration on the antenna; and
$\Delta f_q$ is the frequency change of the input signal due to the effects of vibration on the quartz crystal oscillator.

The frequency change of the input signal due to the effects of vibration on the antenna is proportional to the speed of vibration:

$$\Delta f_a = \frac{A'_v}{\lambda} \quad (E10)$$
$$= A'_v \left(\frac{f_0}{c}\right)$$
$$= \left(\frac{1}{c}\right) f_0 \omega_v A_0 \cos(\omega_v t),$$

where $\lambda$ is the (unperturbed) wavelength of the input signal, and C is the speed of light.

The frequency change of the input signal due to the effects of vibration on the quartz crystal oscillator is proportional to the acceleration of vibration:

$$\Delta f_q = \alpha_q f_0 \quad (E11)$$
$$= k_q A_v'' f_0$$
$$= -f_0 k_q A_0 \omega_v^2 \sin(\omega_v t),$$

where $$\alpha_q = \frac{\delta f_q}{f_{0q}}$$

is the shift of the frequency of the quartz crystal oscillator relative to the nominal value of the frequency of the quartz crystal oscillator;
$f_{0q}$ is the nominal value of the frequency of the quartz crystal oscillator;
$\delta f_q$ is the shift of the frequency of the quartz crystal oscillator from $f_{0q}$; and
$k_q$ is a coefficient of proportionality that characterizes the sensitivity of the quartz crystal oscillator to acceleration effects.

The coefficient $k_q$ depends on various factors, such as the direction of acceleration relative to the crystal axes of the quartz crystal, the specific type of quartz crystal, and the means by which the quartz crystal is mounted in the receiver case. For quartz crystal oscillators typically used in receivers, $k_q \approx -0.102 \times 10^{-9}$.

Let $df_a \equiv \Delta f_{aMAX}$ represent the maximum value of $\Delta f_a$, and $df_q \equiv \Delta f_{qMAX}$ represent the maximum value of $\Delta f_q$; then $$df_a \equiv \Delta f_{aMAX} \quad (E12)$$
$$= \left(\frac{1}{c}\right) f_0 A_0 \omega_v$$
$$= \left(\frac{2\pi}{c}\right) f_0 A_0 f_v,$$

and $$df_q \equiv \Delta f_{qMAX} \quad (E13)$$
$$= f_0 k_q A_0 \omega_v^2$$
$$= 4\pi^2 f_0 k_q A_0 f_v^2.$$

Figure 9:
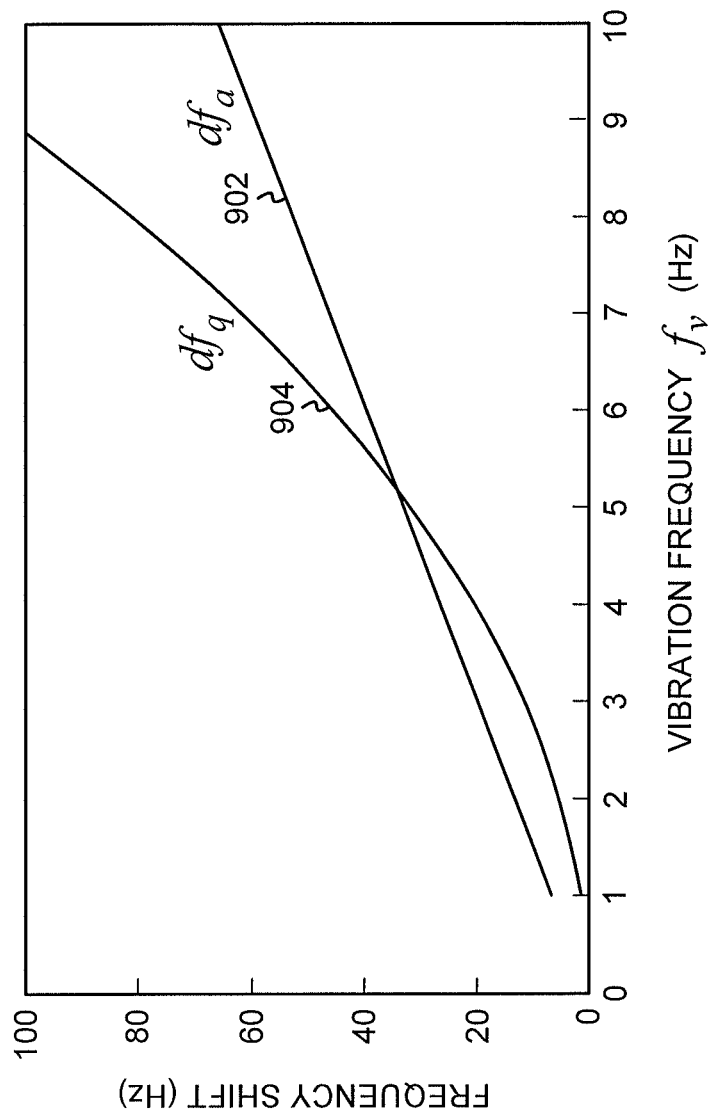
FIG. 9 shows plots of frequency shifts as a function of vibration frequency.

Refer to FIG. 9. Plot 902 shows a representative plot of $df_a$ (Hz) as a function of $f_v$ (Hz) according to (E12); similarly, plot 904 shows a representative plot of $df_q$ (Hz) as a function of $f_v$ according to (E13). For these plots, an amplitude of $A_0=0.2$ m was used. From (E12), $df_a$ varies linearly as a function of $f_v$; from (E13), $df_q$ varies quadratically as a function of $f_v$. For $f_v < \sim 5$ Hz, $df_a > df_q$; for $f_v > \sim 5$ Hz, $df_q$ grows increasingly larger than $df_a$.

If the antenna is moving at a constant velocity, the carrier frequency is offset proportionally to the component the velocity vector projected onto the radius vector between the rover and a specific satellite; that is, the carrier frequency offset depends on the specific satellite channel. Shock and vibration cause acceleration of the antenna. The effect of shock and vibration on GNSS measurements depends on the projection of the acceleration vector onto the radius vector between the antenna and a specific satellite; that is, the effect of shock and vibration also depends on the specific satellite channel.

The frequency of the quartz crystal oscillator is offset proportionally to the acceleration of the quartz crystal oscillator; if the quartz crystal oscillator is moving at a constant velocity (zero acceleration), then the frequency offset of the quartz crystal oscillator is zero. A quartz crystal is anisotropic, and the frequency offset depends on the acceleration vector relative to the crystal axes. Typically, the frequency offset is the most sensitive along one crystal axis (the main crystal axis), and the frequency offset is proportional to the component of the acceleration vector projected onto the main crystal axis. The frequency offset of the quartz crystal oscillator is therefore the same for all satellite channels.

Figure 3A:
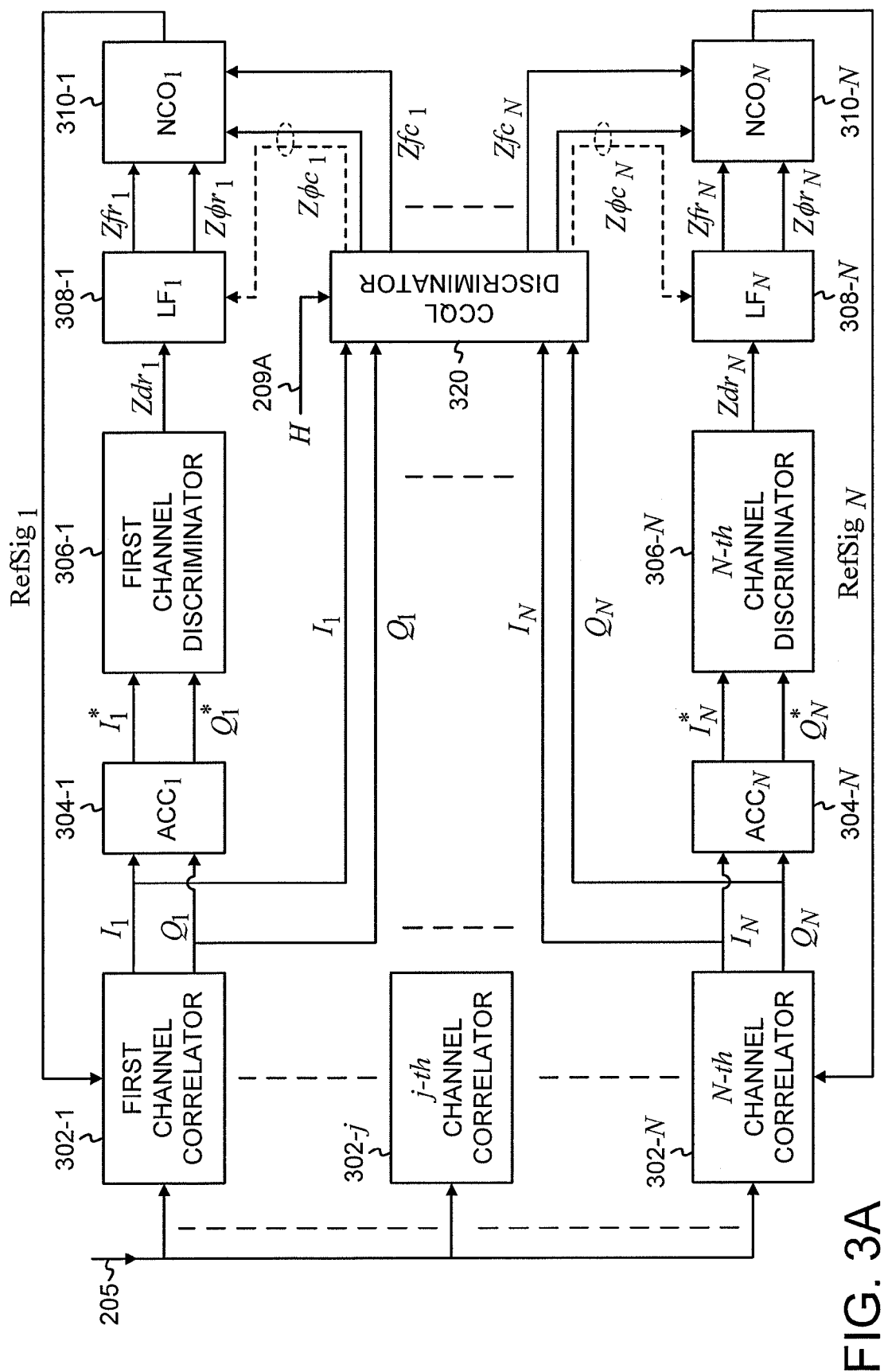
FIG. 3A and FIG. 3B show schematic functional block diagrams of a digital channel processor.
Figure 3B:
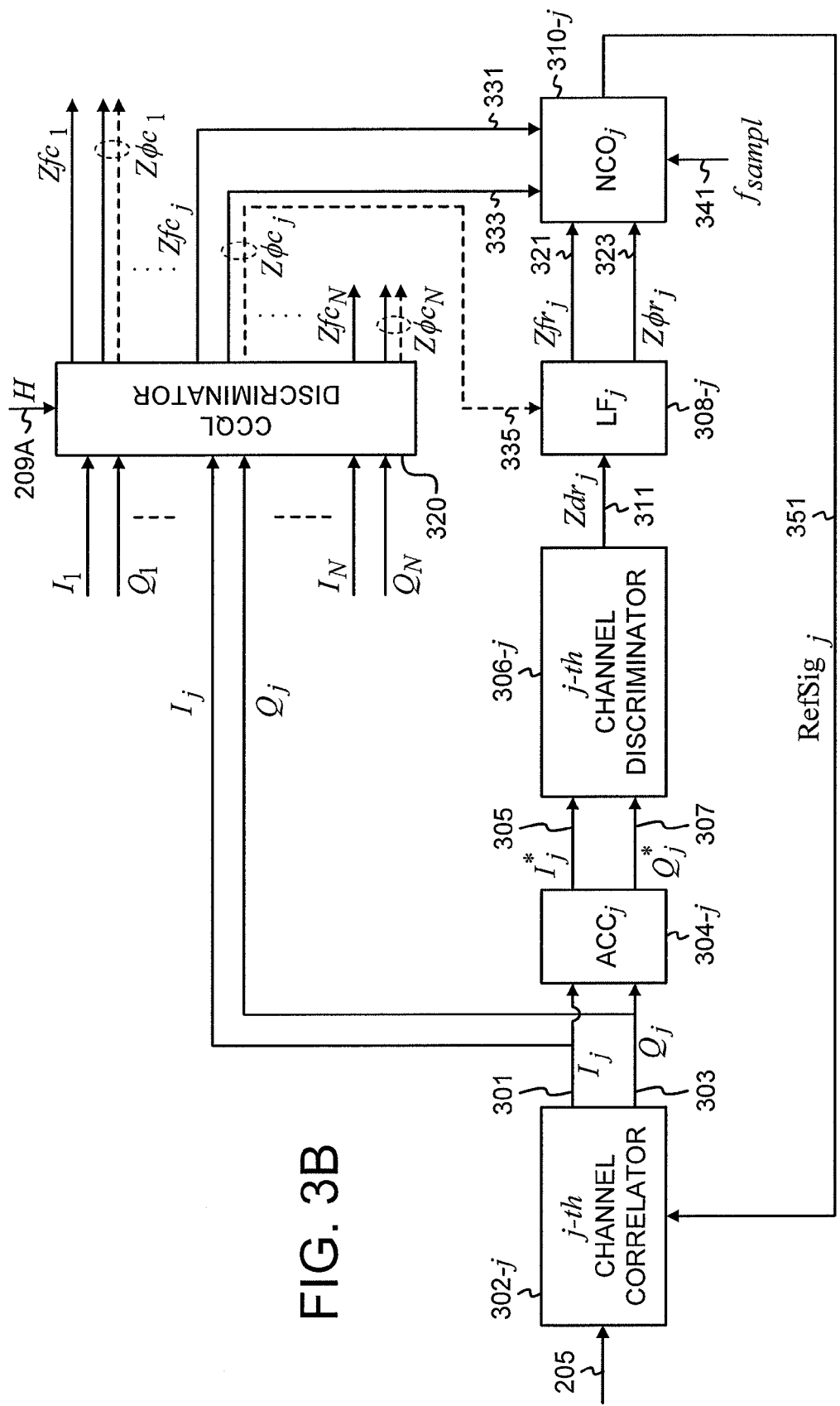

FIG. 3A and FIG. 3B show a schematic functional block diagram of the phase-lock loops, according to an embodiment of the invention, in the digital channel processing unit 206 (FIG. 2). The input digital signal 205 (FIG. 2) is processed by a set of individual digital channel processors; as discussed above, each specific satellite channel corresponds to navigation signals transmitted from a specific navigation satellite on a specific frequency band. In the example shown in FIG. 1, there are five satellite channels, corresponding to navigation satellite 120A—navigation satellite 120E, respectively. In general, on a single frequency band, there are N satellite channels, where N is an integer referring to the number of satellites in view from the rover. A specific satellite channel is indexed as satellite channel j, where j is an integer j=1, . . . , N.

The structure of three representative digital channel processors is shown in FIG. 3A. Operations for all digital channel processors are similar; detailed operation of the j-th digital channel processor is described in reference to FIG. 3B.

First refer to FIG. 3A. The first digital channel processor includes the first channel correlator 302-1, the first reset accumulator 304-1 ($ACC_1$), the first channel discriminator 306-1, the first loop filter 308-1 ($LF_1$), and the first numerically-controlled oscillator 310-1 ($NCO_1$). Similarly, the N-th digital channel processor includes the N-th channel correlator 302-N, the N-th reset accumulator 304-N ($ACC_N$), the N-th channel discriminator 306-N, the N-th loop filter 308-N ($LF_N$), and the N-th numerically-controlled oscillator 310-N ($NCO_N$).

FIG. 3B shows the structure of the j-th digital channel processor. The j-th digital channel processor includes the j-th channel correlator 302-j, the j-th channel reset accumulator 304-j ($ACC_j$), the j-th channel discriminator 306-j, the j-th channel loop filter 308-j ($LF_j$), and the j-th channel numerically-controlled oscillator 310-j ($NCO_j$). The digital signal 205 is inputted into the correlator 302-j, which processes the digital signals corresponding to the j-th satellite. The correlator 302-j outputs the in-phase correlation signal 301 $I_j$ [according to (E1)] and the quadrature-phase correlation signal 303 $Q_j$ [according to (E2)]. The correlator 302-j outputs the signal $I_j$ and the signal $Q_j$ at a high clock frequency (for example, 1 kHz). The values $I_j$ and $Q_j$ are inputted into the reset accumulator 304-j and the common coordinate-quartz loop (CCQL) discriminator 320. More details of the CCQL discriminator are described below.

The reset accumulator 304-j performs an accumulate-and-reset operation, also referred to as an accumulate-and-dump operation. A reset accumulator initializes its value to zero, receives input values of a variable, sums the input values over an accumulation interval $\Delta T$, and outputs the sum. The reset accumulator then repeats the cycle of operation for the next set of input values. The reset accumulator outputs the signal 305 $I^*_j$; and the signal 307 $Q^*_j$ (defined below) at a much lower frequency than the clock frequency for $I_j$ and $Q_j$; for example, a frequency of 200 Hz. The reset accumulator 304-j receives the in-phase correlation signal and outputs the accumulated in-phase correlation signal $I^*_j = \Sigma I_j$ (information symbols are removed prior to accumulation). Similarly, the reset accumulator 304-$j$ receives the quadrature-phase correlation signal $Q_j$ and outputs the accumulated quadrature-phase correlation signal $Q^*_j = \Sigma Q_j$ (information symbols are removed prior to accumulation).

The values of $I^*_j$ and $Q^*_j$ are inputted into the discriminator 306-$j$, which produces the PLL tracking error signal 311, $$Zdr_j = \arctan\left(\frac{Q^*_j}{I^*_j}\right).$$

The PLL tracking error signal $Zdr_j$ is inputted into the loop filter 308-$j$. The loop filter 308-$j$ determines the PLL order, mostly with one or two accumulators assigning the second or third order, respectively. In some embodiments, the common phase-control signal 335 $Z\phi c_j$, described in more detail below, is also inputted from the CCQL discriminator 320 into the loop filter 308-$j$.

In the embodiment shown in FIG. 3B, the loop filter 308-$j$ outputs the individual channel frequency-control signal 321 $Z\theta r_j$ and the individual channel phase-control signal 323 $Z\phi r_j$. The CCQL discriminator 320 outputs the common frequency-control signal 331 $Zfc_j$ and the common phase-control signal 333 $Z\phi c_j$. These four control signals are used to control operational parameters of the NCO 310-$j$ (NCO$_j$), as described in more detail below in reference to FIG. 8. Other embodiments, as described below, use fewer than four control signals. Details of the control signals are also described below.

Figure 4A:
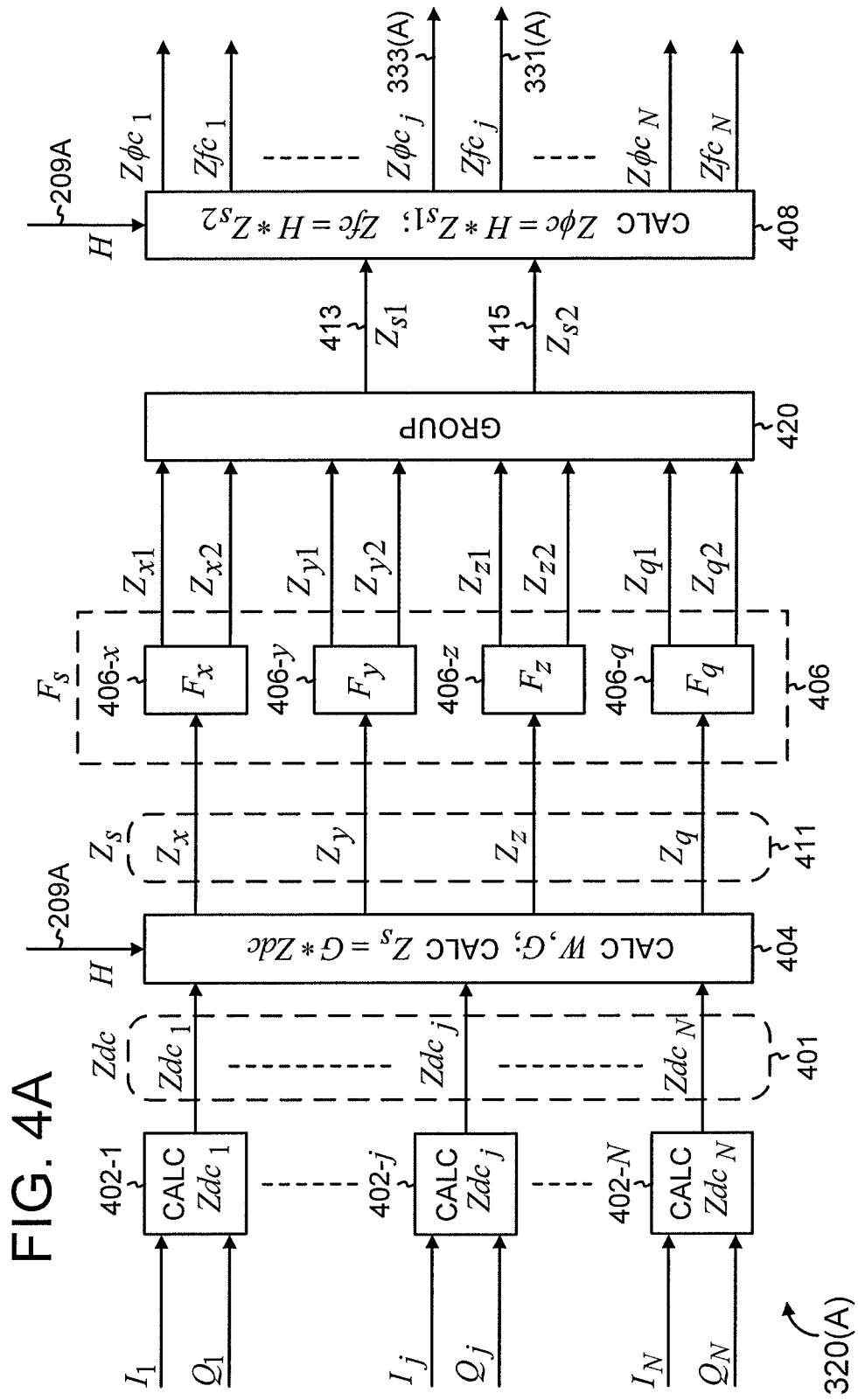
FIG. 4A shows a schematic functional block diagram of a first embodiment of a discriminator for a common coordinate-quartz loop.

FIG. 4A shows a schematic functional block diagram for a first embodiment of the CCQL discriminator 320 [this embodiment is referenced as the CCQL discriminator 320 (A)]. A vector of initial channel phase tracking errors (mismatches) is first calculated from the in-phase correlation signals and the quadrature-phase correlation signals; this vector is denoted $$Zdc = (Zdc_1, \ldots, Zdc_j, \ldots Zdc_N). \quad (E14)$$

The vector components are calculated schematically as shown in FIG. 4A. For the first channel, the in-phase correlation signal $I_1$ and the quadrature-phase correlation signal $Q_1$ are inputted into the operator 402-1 to calculate (CALC) $Zdc_1$; the output is the value $Zdc_1$. For the j-th channel, the in-phase correlation signal $I_j$ and the quadrature-phase correlation signal $Q_j$ are inputted into the operator 402-$j$ to calculate (CALC) $Zdc_j$; the output is the value $Zdc_j$. For the N-th channel, the in-phase correlation signal $I_N$ and the quadrature-phase correlation signal $Q_N$ are inputted into the operator 402-N to calculate (CALC) $Zdc_N$; the output is the value $Zdc_N$.

In an embodiment, the vector component $Zdc_j$ is calculated as $$Zdc_j = \arctan\left(\frac{Q_j}{I_j}\right). \quad (E15)$$

In another embodiment, the vector component $Zdc_j$ is calculated as $$Zdc_j = I_j * Q_j. \quad (E16)$$

The vector $Zdc$ 401 and the matrix H 209A (see below) are inputted into the operator 404, in which a four-dimensional vector $Z_s$ 411 is calculated using the least-mean-squares (LSM) method. The vector $Z_s = (Z_x, Z_y, Z_z, Z_q)$ is a mean-weighted tracking error vector, where the three components $(Z_x, Z_y, Z_z)$ correspond to the projections of the tracking error vector onto the (x,y,z) Cartesian axes; and $Z_q$ is the time component of the tracking error vector, $Z_q = c\Delta t$, where is the speed of light, and $\Delta t$ is the tracking error of the PLL for the time coordinate t.

The matrix H 209A is calculated in the user data processing unit 208 and fed back to the digital channel processing unit 206 as part of the output 209 (FIG. 2). The matrix H is the matrix of directional cosines supplemented by a unit column:

$$H = \begin{vmatrix} \cos\alpha_1 & \cos\beta_1 & \cos\gamma_1 & 1 \\ \ldots & \ldots & \ldots & \ldots \\ \cos\alpha_j & \cos\beta_j & \cos\gamma_j & 1 \\ \ldots & \ldots & \ldots & \ldots \\ \cos\alpha_N & \cos\beta_N & \cos\gamma_N & 1 \end{vmatrix}. \quad (E17)$$

The angles $(\alpha_j, \beta_j, \gamma_j)$ refer to the angles between the radius vector from the rover to the j-th satellite and the three corresponding axes of the (x,y,z) Cartesian coordinate system.

The operator 404 first calculates a matrix W, an N×N matrix of weight estimates for measurements. The matrix W depends on how $Zdc_j$ above is calculated. For $$Zdc_j = \arctan\left(\frac{Q_j}{I_j}\right), \quad (E15)$$

the matrix W is given by:

$$W_{ij} = \begin{cases} \tilde{I}_j^2 & i = j; \\ 0 & i \neq j; \end{cases} \quad (E18)$$

where $\tilde{I}_j$ is the smoothed in-phase component of the j-th channel. For $Zdc_j = I_j * Q_j$ (E16), the matrix W is given by:

$$W_{ij} = \begin{cases} I_j^2 & i = j. \\ 0 & i \neq j. \end{cases} \quad (E19)$$

From the matrix W and the matrix H, the matrix G is calculated, where $$G = (H^T * W * H)^{-1} * H^T * W. \quad (E20)$$

For an arbitrary matrix M, $M^T$ refers to the transpose of matrix M, and $M^{-1}$ refers to the inverse of matrix M. The vector $Z_s$ is then calculated as $$Z_s = G * Zdc. \quad (E21)$$

The vector $Z_s = (Z_x, Z_y, Z_y, Z_q)$ is then transformed by an operator $F = (F_x, F_y, F_y, F_q)$. The transformation performed by the operator $F_s$ depends on the CCQL order and on the CCQL control mode. There are three CCQL control modes: frequency control (FC), phase control (PC), and frequency and phase control (FPC). These control modes are described in more detail below. For frequency control, the operator $F_s$ transforms the vector $Z_s$ into the vector $Z_{s1}$, where $Z_{s1} = (Z_{x1},$ $Z_{y1}, Z_{z1}, Z_{q1}$). For phase control, the operator $F_s$ transforms the vector $Z_s$ into the vector $Z_{s2}$, where $Z_{s2} = (Z_{x2}, Z_{y2}, Z_{z2}, Z_{q2})$. For frequency and phase control, the operator $F_s$ transforms the vector $Z_s$ into the pair of vectors $Z_{s1}$ and $Z_{s2}$.

The operator $F_s$ acts as a loop filter whose output is a smoothed function of the input. The vector $Z_{s1} = (Z_{x1}, Z_{y1}, Z_{z1}, Z_{q1})$ is the smoothed tracking error vector. The vector $Z_{s2} = (Z_{x2}, Z_{y2}, Z_{z2}, Z_{q2})$ is the smoothed tracking error rate vector, where the tracking error rate is proportional to the time derivative of the tracking error.

The individual loops and the common quartz loop solve different tasks; therefore, their orders can be different. Individual loops track slow phase changes caused, for example, by satellite acceleration and smooth accelerations of the rover (for example, during smooth start of the vehicle); a third-order PLL can be used in the individual loops. If these accelerations are negligible and can be neglected, then a second-order PLL can be used in individual loops. If there are intense dynamic disturbances, then depending on their nature, a common quartz loop of a specific order can be used.

FIG. 4A schematically shows the transformation of $Z_s$ 411 by the operator $F_s$ 406, which generates both $Z_{s1}$ 413 and $Z_{s2}$ 415. The vector component $Z_x$ is inputted into the operator $F_x$ 406-$x$; the outputs are $Z_{x1}$ and $Z_{x2}$. The vector component $Z_y$ is inputted into the operator $F_y$ 406-$y$; the outputs are $Z_{y1}$ and $Z_{y2}$. The vector component $Z_z$ is inputted into the operator $F_z$ 406-$z$; the outputs are $Z_{z1}$ and $Z_{z2}$. The vector component $Z_q$ is inputted into the operator $F_q$ 406-$q$; the outputs are $Z_{q1}$ and $Z_{q2}$. The output vector components are inputted into the group operator 420, which yields the vector $Z_{s1} = (Z_{x1}, Z_{y1}, Z_{z1}, Z_{q1})$ 413 and the vector $Z_{s2} = (Z_{x2}, Z_{y2}, Z_{z2}, Z_{q2})$ 415. In general, the operators $F_x, F_y, F_z$, and $F_q$ are independent. In some embodiments, all of the operators are the same. Embodiments of loop filters for implementing the operator $F_s$ are described below.

The vector $Z_{s1}$ 413, the vector $Z_{s2}$ 415, and the matrix H 209A are inputted into the operator 408, which calculates the common phase-control vector $Z\phi c$ and the common frequency-control vector $Zfc$. The common phase-control vector and the common frequency-control vector are calculated by projecting the vectors $Z_{s1}$ and $Z_{s2}$, respectively, onto the radius vectors between the rover and the satellites:

$$Z\phi c = H^* Z_{s1}; \tag{E22}$$

and $$Zfc = H^* Z_{s2}, \tag{E23}$$

where $$Z\phi c = (Z\phi c_1, \ldots, Z\phi c_j, \ldots, Z\phi c_N), \tag{E24}$$

and $$Zfc = (Zfc_1, \ldots, Zfc_j, \ldots, Zfc_N). \tag{E25}$$

Representative components are referenced for the j-th channel: the common frequency-control vector $Zfc_j$ 331(A) and the common phase-control vector $Z\phi c_j$ 333(A) are inputted into the NCO 310-$j$ [here the common frequency-control vector 331(A) is a first embodiment of the common frequency-control vector 331 in FIG. 3B, and the common phase-control vector 333(A) is a first embodiment of the common phase-control vector 333 in FIG. 3B]. In this embodiment, there is no common phase-control vector 335 inputted into the loop filter 308-$j$.

Figure 6:
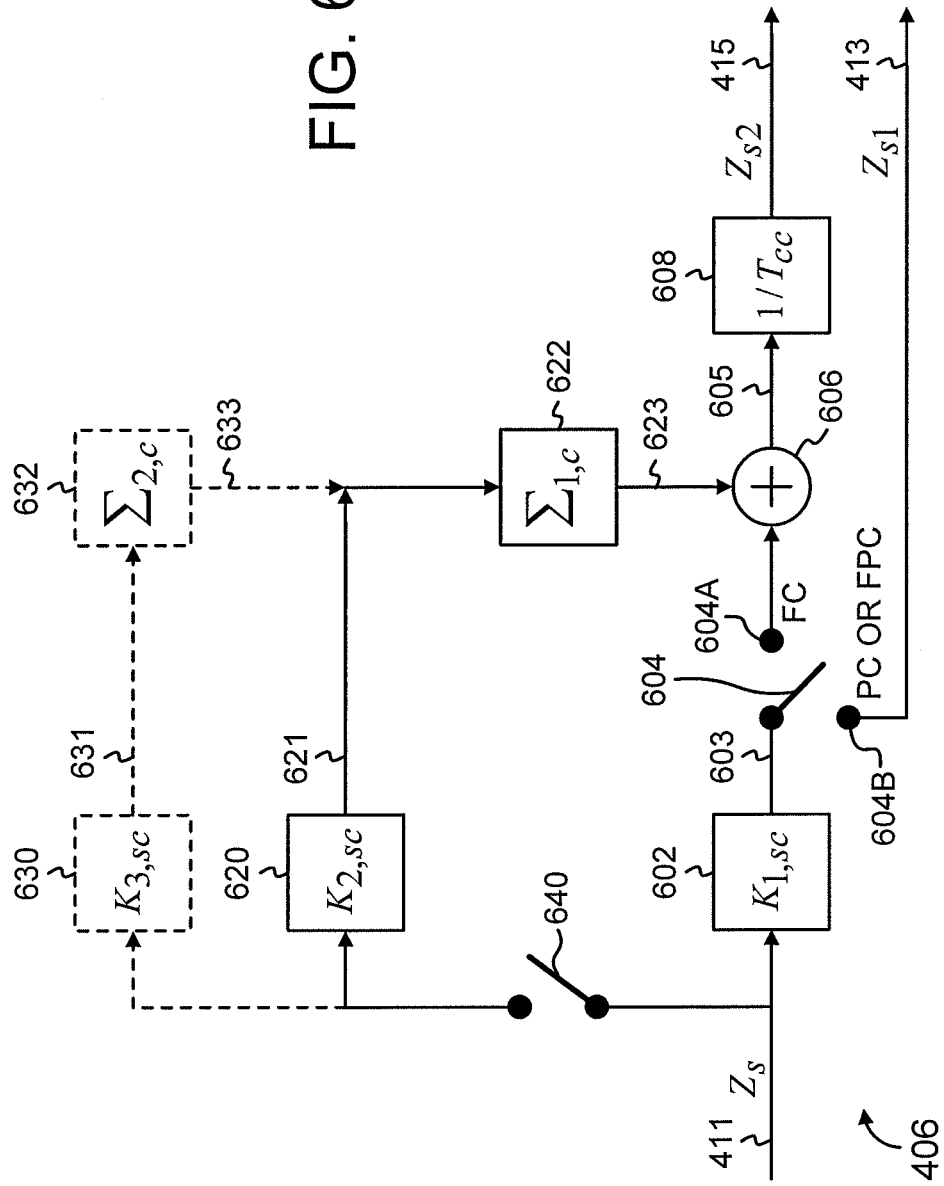
FIG. 6 shows a schematic functional block diagram of a loop filter for an embodiment of a common coordinate-quartz loop.

As discussed above, in the embodiment shown in FIG. 4A, the operator 406 generates both the vector $Z_{s1}$ and the vector $Z_{s2}$, and the operator 408 calculates both the common phase-control vector $Z\phi c$ and the common frequency-control vector $Zfc$. In another embodiment, the operator 406 generates only the vector $Z_{s1}$, and the operator 408 calculates only the common phase-control vector $Z\phi c$. In a further embodiment, the operator 406 generates only the vector $Z_{s2}$, and the operator 408 calculates only the common frequency-control vector $Zfc$. FIG. 6, described below, shows an embodiment of the operator 406 that, through the operation of two switches, can generate all three combinations of outputs: only the vector $Z_{s1}$, only the vector $Z_{s2}$, or both the vector $Z_{s1}$ and the vector $Z_{s2}$.

FIG. 4B shows a schematic functional block diagram for a second embodiment of the CCQL discriminator 320 [this embodiment is referenced as the CCQL discriminator 320 (B)]. Compared to the CCQL discriminator 320(A) shown in FIG. 4A, the operator $F_s$ 416 is simpler than the operator $F_s$ 406, and the operator 418 is simpler than the operator 408. The CCQL discriminator 320(B) outputs only common phase-control signals (no common frequency-control signals are outputted). The operator $F_s$ 416 is implemented as a loop filter. The vector $Z_s$ 411 is inputted into the operator $F_s$ 416, which multiplies $Z_s$ by a coefficient $K_{1,c}$ to generate the output vector $Z_{s1}$ 431. The vector $Z_{s1}$ 431 and the matrix H 209A are inputted into the operator 418, which calculates the common phase-control vector $Z\phi c$ according to (E22) above.

Each component of $Z\phi c$ is inputted in parallel to two on/off switches. In FIG. 4B, three representative components are shown: $Z\phi c_1$ is inputted to switch 410-1 and switch 412-1; $Z\phi c_j$ is inputted to switch 410-$j$ and switch 412-$j$; and $Z\phi c_N$ is inputted to switch 410-N and switch 412-N. Let the switch group PC refer to the group of switches (410-1, ..., 410-$j$, ..., 410-N); and let the switch group FC refer to the group of switches (412-1, ..., 412-$j$, ..., 412-N). As discussed in more detail below, there are three control modes [phase control (PC), frequency control (FC), and frequency and phase control (FPC) mode] for the numerically-controlled oscillator 310-$j$ (FIG. 3B). Depending on the desired control mode for the numerically-controlled oscillator, the switch group PC and the switch group FC are opened or closed. When the PC mode is implemented, the switch group PC is closed, and the switch group FC is opened. When the FC mode is implemented, the switch group FC is closed, and the switch group PC is opened. When the FPC mode is implemented, the switch group PC and the switch group FC are both closed. Representative components are referenced for the j-th channel: when the switch 410-$j$ is closed, the common phase-control vector $Z\phi c_j$ 333(B) is inputted into the NCO 310-$j$ [here the common phase-control vector 333(B) is a second embodiment of the common phase-control vector 333 in FIG. 3B]. In this embodiment, when the switch 412-$j$ is closed, the common phase-control vector 335(B) is inputted into the loop filter 308-$j$.

Figure 5A:
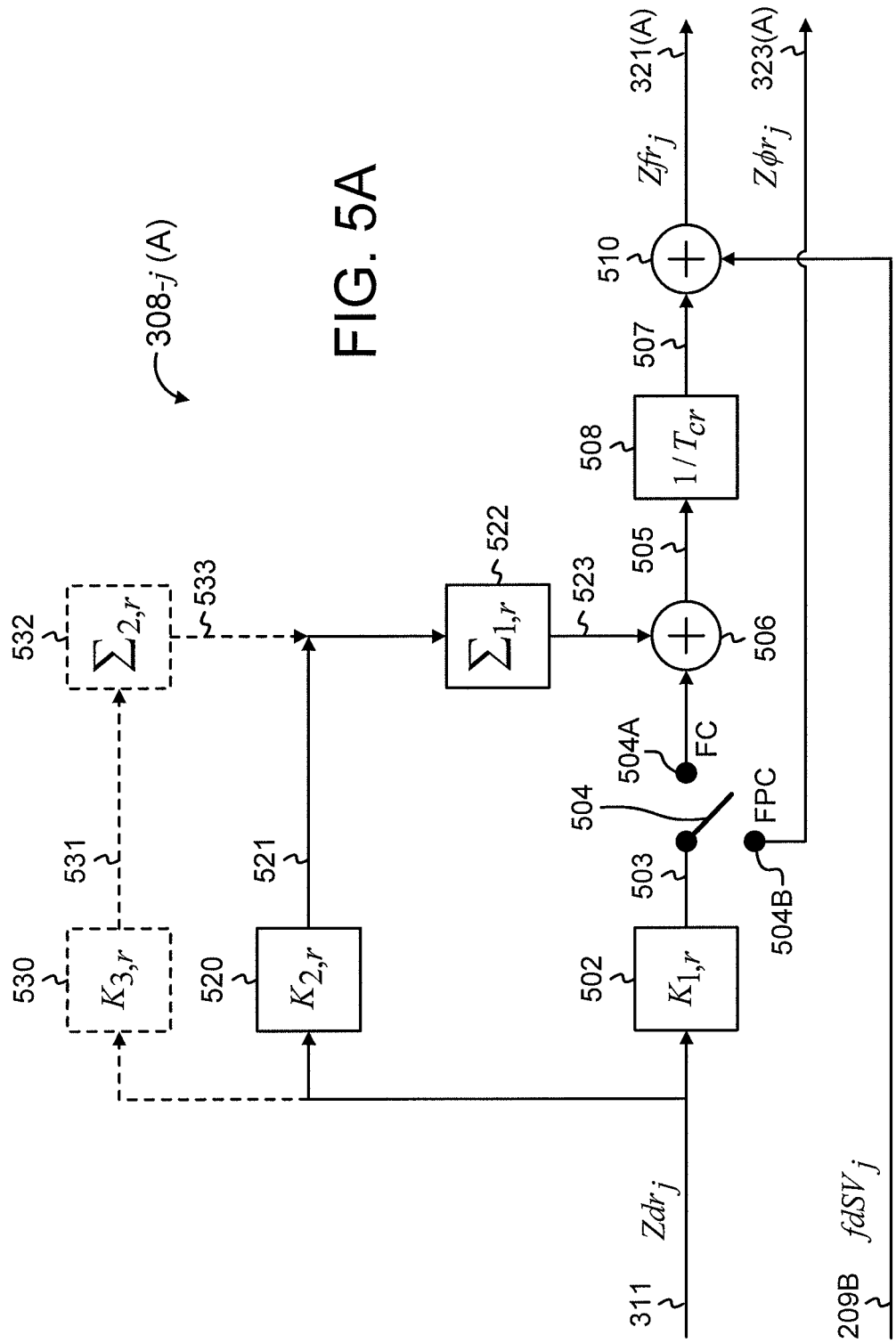
FIG. 5A shows a schematic functional block diagram of a first embodiment of a loop filter for a phase-lock loop.

FIG. 5A shows a schematic functional block diagram for a first embodiment of the loop filter 308-$j$ for the individual j-th satellite channel (FIG. 3B). This loop filter is referenced as the loop filter 308-$j$ (A). The solid lines represent the functional blocks to implement a second-order PLL. The dotted lines represent additional functional blocks (in addition to those for the second-order loop filter) to implement a third-order PLL. A second-order PLL can be used when the rover moves along an approximately straight-line trajectory. A third-order PLL can be used when the rover moves along an approximately parabolic trajectory (assuming the time derivative of the rover acceleration is sufficiently small). The second-order loop filter is described first, followed by a description of the third-order loop filter. The loop filter 308-$j$ (A) operates according to a clock with an update period of $T_{cr}$; the update frequency is $f_{cr}=1/T_{cr}$. Each cycle of operation of the loop filter 308-$j$ (A) occurs at a set of discrete time instants $t_{cr}$; the period between consecutive time instants $t_{cr}$, is the update period $T_{cr}$ $t_{cr,i+1}-t_{cr,i}$, where i is an arbitrary integer index.

The tracking error signal 311 $Zdr_j$ outputted from the j-th channel discriminator 306-$j$ (FIG. 3B) is inputted into the operator 502, which multiplies $Zdr_j$ by the coefficient $K_{1,r}$. The output signal 503 ($K_{1,r}Zdr_j$) is inputted into the switch 504, which has two output positions: switch output 504A for frequency control (FC) of the individual phase-lock loop and switch output 504B for frequency and phase control (FPC) of the individual phase-lock loop. Older generation navigation receivers typically use only frequency control; more modern navigation receivers typically use frequency and phase control, which, in some instances, yield smaller errors than frequency control alone. A single module can be implemented for both FC and FPC modes; the switch 504 allows selection of the desired mode. In other embodiments, a module is implemented for only FC mode or only FPC mode.

Figure 5B:
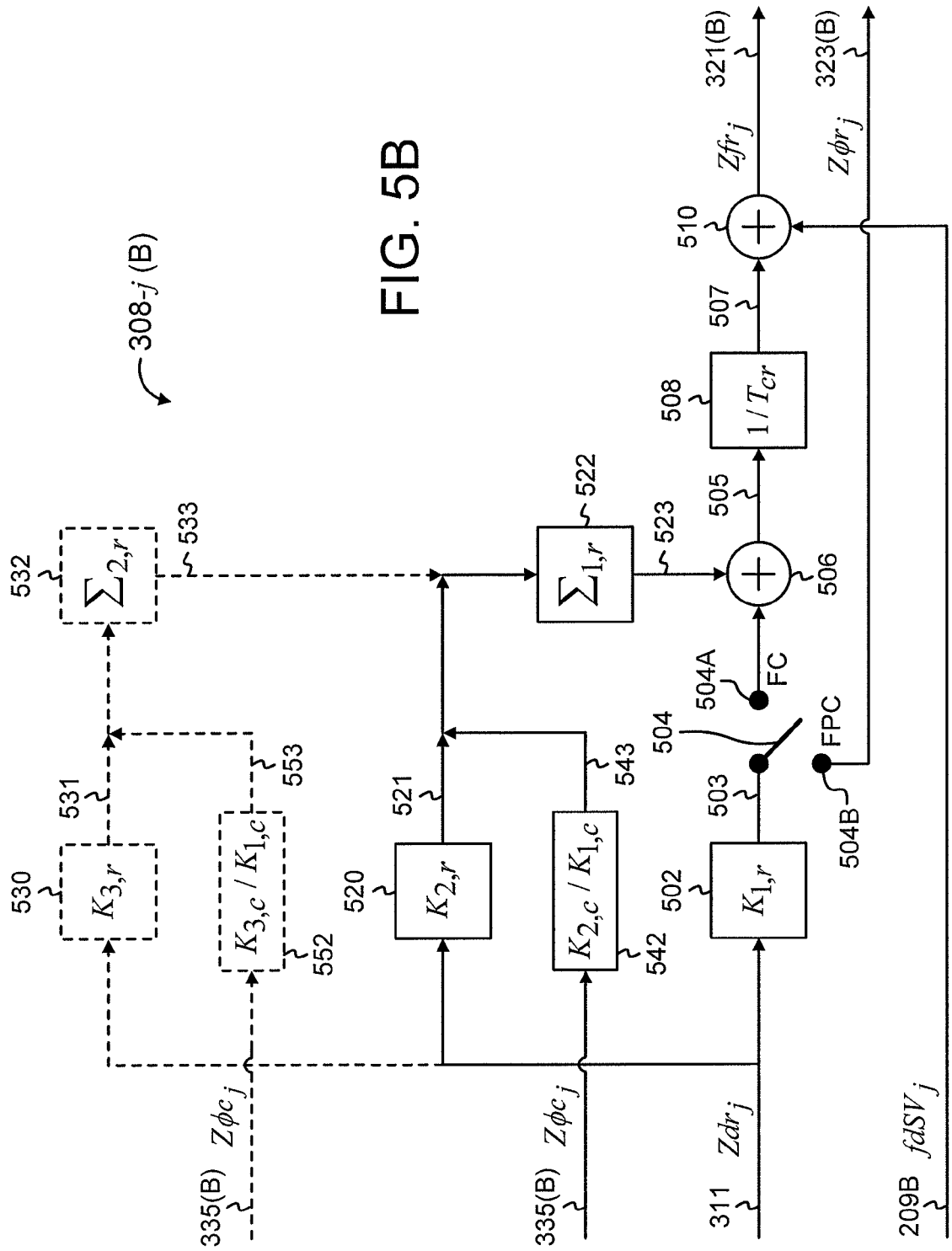
FIG. 5B shows a schematic functional block diagram of a second embodiment of a loop filter for a phase-lock loop.

For a second-order loop filter with FC operation, the switch 504 is switched to the switch output 504A, and the output signal 503 is inputted into the sum operator 506. The tracking error signal 311 $Zdr_j$ is also inputted into the operator 520, which multiplies $Zdr_j$ by the coefficient $K_{2,r}$. The output signal 521 ($K_{2,r}Zdr_j$) is inputted into the accumulator 522, which accumulates values of the output signal 521. Note: In FIG. 5A, FIG. 5B, and FIG. 6B, the accumulators represented by the symbol $\Sigma$ are not reset accumulators. The output signal 523 (accumulated values of output signal 521) is inputted into the sum operator 506. The output signal 505 (sum of output signal 503 and output signal 523) is inputted into the operator 508, which multiplies the output signal 505 by the value $1/T_{cr}$.

In the embodiment shown, the output signal 507 is inputted into the sum operator 510. A predicted Doppler shift 209B $f_{d\,SV_j}$ for the j-th satellite is also inputted into the sum operator 510. Refer to FIG. 2. The predicted Doppler shift 209B is calculated in the user data processing unit 208 (which calculates the radial velocity of a satellite using ephemeris data and solutions of the navigation task) and is included in the output 209 fed back from the user data processing unit 208 to the digital channel processing unit 206. The predicted Doppler shift 209B unloads the accumulator 522 (reduces the values stored in the accumulator and increases the accuracy of representation of these values). The output signal 321(A) $Zfr_j$ is outputted to the NCO 310-$j$ [here the output signal 321(A) is a first embodiment of the output signal 321 in FIG. 3B]. Calculation of the predicted Doppler shift 209B, however, increases the computational load and is not used in some embodiments; then the output signal 321(A) $Zfr_j$ is the same as the output signal 507.

For a second-order loop filter with FPC operation, the switch 504 is switched to the switch output 504B, and the output signal 503 is outputted to the NCO 310-$j$ as the output signal 323(A) $Z\phi r_j$ [here the output signal 323(A) is a first embodiment of the output signal 323 in FIG. 3B]. The output signal 523 is inputted into the sum operator 506. Since the switch 504 is switched to the switch output 504B, the output signal 505 is the same as the output signal 523. The output signal 505 is then processed as described above in reference to FC operation.

For a third-order loop filter with FC operation, the switch 504 is switched to the switch output 504A, and the output signal 503 is inputted into the sum operator 506. The tracking error signal 311 $Zdr_j$ is also inputted into the operator 520, which multiplies $Zdr_j$ by the coefficient $K_{2,r}$. The output signal 521 ($K_{2,r}Zdr_j$) is inputted into the accumulator 522. The tracking error signal 311 $Zdr_j$ is further inputted into the operator 530, which multiplies $Zdr_j$ by the coefficient $K_{3,r}$. The output signal 531 ($K_{3,r}Zdr_j$) is inputted into the accumulator 532, which accumulates the output signal 531. The output signal 533 (accumulated values of output signal 531) is inputted into the accumulator 522. The output signal 523 (accumulated values of output signal 521 and output signal 533) is inputted into the sum operator 506. The output signal 505 is then processed as described above in reference to the second-order loop filter with FC operation.

For a third-order loop filter with FPC operation, the switch 504 is switched to the switch output 504B, and the output signal 503 is outputted to the NCO 310-$j$ as the output signal 323(A) $Z\phi r_j$. The output signal 523 is inputted into the sum operator 506. Since the switch 504 is switched to the switch output 504B, the output signal 505 is the same as the output signal 523. The output signal 505 is then processed as described above in reference to the second-order loop filter with FPC operation.

FIG. 5B shows a schematic functional block diagram for a second embodiment of the loop filter 308-$j$ for the individual j-th satellite channel (FIG. 3B). This loop filter is referenced as the loop filter 308-$j$ (B). The solid lines represent the functional blocks to implement a second-order PLL. The dotted lines represent additional functional blocks (in addition to those for the second-order loop filter) to implement a third-order PLL. The second-order loop filter is described first; a description of the third-order loop filter then follows. The loop filter 308-$j$ (B) operates according to a clock with an update period of $T_{cr}$; the update frequency is $f_{cr}=1/T_{cr}$. Each cycle of operation of the loop filter 308-$j$ (B) occurs at a set of discrete time instants $t_{cr}$; the period between consecutive time instants $t_{cr}$ is the update period $T_{cr}=(t_{cr,i+1}-t_{cr,i})$, where i is an arbitrary integer index.

The tracking error signal 311 $Zdr_j$ (FIG. 3B) is inputted into the operator 502, which multiplies $Zdr_j$ by the coefficient $K_{1,r}$. The output signal 503 ($K_{1,r}Zdr_j$) is inputted into the switch 504, which has two output positions: switch output 504A for frequency control (FC) of the individual phase-lock loop and switch output 504B for frequency and phase control (FPC) of the individual phase-lock loop.

For a second-order loop filter with FC control, the switch 504 is switched to the switch output 504A, and the output signal 503 is inputted into the sum operator 506. The tracking error signal 311 $Zdr_j$ is also inputted into the operator 520, which multiplies $Zdr_j$ by the coefficient $K_{2,r}$. The output signal 521 ($K_{2,r}Zdr_j$) is inputted into the accumulator 522. The common phase-control signal 335(B) $Z\phi c_j$ from the CCQL discriminator 320 (FIG. 3B and FIG. 4B) is inputted into the operator 542, which multiplies $Z\phi c_j$ by the coefficient $K_{2,c}/K_{1,c}$. The output signal 543 [$(K_{2,c}/K_{1,c})Z\phi c_j$] is inputted into the accumulator 522.

The output signal 523 (accumulated values of output signal 521 and output signal 543) is inputted into the sum operator 506. The output signal 505 (sum of output signal 503 and output signal 523) is then processed as described above in reference to the loop filter 308-$j$ (A). The output signal 321(B) $Zfr_j$ is outputted to the NCO 310-$j$ [here the output signal 321(B) is a second embodiment of the output signal 321 in FIG. 3B].

For a second-order loop filter with FPC operation, the switch 504 is switched to the switch output 504B, and the output signal 503 is outputted to the NCO 310-$j$ as the output signal 323(B) $Z\phi r_j$ [here the output signal 323(B) is a second embodiment of the output signal 323 in FIG. 3B]. The output signal 523 is inputted into the sum operator 506. Since the switch 504 is switched to the switch output 504B, the output signal 505 is the same as the output signal 523. The output signal 505 is then processed as described above in reference to the loop filter 308-$j$ (A). The output signal 321(B) $Zfr_j$ is outputted to the NCO 310-$j$.

For a third-order loop filter with FC operation, the switch 504 is switched to the switch output 504A, and the output signal 503 is inputted into the sum operator 506. The tracking error signal 311 $Zdr_j$ is also inputted into the operator 520, which multiplies $Zdr_j$ by the coefficient $K_{2,r}$. The output signal 521 ($K_{2,r}Zdr_j$) is inputted into the accumulator 522. The common phase-control signal 335(B) $Z\phi c_j$ from the CCQL discriminator 320 (FIG. 3B and FIG. 4B) is inputted into the operator 542, which multiplies $Z\phi c_j$ by the coefficient $K_{2,c}/K_{1,c}$. The output signal 543 [$(K_{2,c}/K_{1,c})Z\phi c_j$] is inputted into the accumulator 522.

The tracking error signal 311 $Zdr_j$ is also inputted into the operator 530, which multiplies $Zdr_j$ by the coefficient $K_{3,r}$. The output signal 531 ($K_{3,r}Zdr_j$) is inputted into the accumulator 532. The common phase-control signal 335(B) $Z\phi c_j$ is also inputted into the operator 552, which multiplies $Z\phi c_j$ by the coefficient $K_{3,c}/K_{1,c}$. The output signal 553 [$(K_{3,c}/K_{1,c})Z\phi c_j$] is inputted into the accumulator 532. The accumulator 532 accumulates values of output signal 531 and output signal 553.

The output signal 533 (accumulated values of output signal 531 and output signal 553) is inputted into accumulator 522. The accumulator 522 accumulates values of output signal 521, output signal 543, and output signal 533. The output signal 523 (accumulated values of output signal 521, output signal 543, and output signal 533) is inputted into the sum operator 506. The output signal 505 (sum of output signal 503 and output signal 523) is then processed as described above in reference to the loop filter 308-$j$ (A). The output signal 321(B) is outputted to the NCO 310-$j$ (FIG. 3B).

For a third-order PLL filter with FPC operation, the switch 504 is switched to the switch output 504B, and the output signal 503 is outputted to the NCO 310-$j$ as the output signal 323(B) $Z\phi r_j$. The output signal 523 is inputted into the sum operator 506. Since the switch 504 is switched to the switch output 504B, the output signal 505 is the same as the output signal 523. The output signal 505 is then processed as described above in reference to the loop filter 308-$j$ (A). The output signal 321(B) is outputted to the NCO 310-$j$ (FIG. 3B).

FIG. 6 shows a schematic functional block diagram for an embodiment of the $F_s$ operator 406 in the CCQL discriminator 320 (FIG. 4A). The loop filter 406 operates according to a clock with an update period of $T_{cc}$; the update frequency is $f_{cc}=1/T_{cc}$. Each cycle of operation of the loop filter 406 occurs at a set of discrete time instants $t_{cc}$; the period between consecutive time instants $t_{cc}$ is the update period $T_{cc}=t_{cc,i+1}-t_{cc,i}$, where i is an arbitrary integer index.

The input to the loop filter 406 is the vector $Z_s=(Z_x,Z_y,Z_z,Z_q)$ 411, which is received from the operator 404 (FIG. 4A). The outputs of the loop filter 406 are determined by the position of the switch 640 and by the position of the switch 604 (FIG. 6). First consider the configuration in which the switch 640 is closed. When the switch 604 is switched to the switch output 604A [frequency control (FC)], $F_s$ transforms the vector $Z_s=(Z_x,Z_y,Z_y,Z_q)$ into the single vector $Z_{s2}=(Z_{x2},Z_{y2},Z_{z2},Z_{q2})$. When the switch 604 is switched to the switch output 604B (FPC), $F_s$ transforms the vector $Z_s=(Z_x,Z_y,Z_y,Z_q)$ into two vectors: the vector $Z_{s1}=(Z_{x1},Z_{y1},Z_{z1},Z_{q1})$ and the vector $Z_{s2}=(Z_{x2},Z_{y2},Z_{z2},Z_{q2})$. Now consider the configuration in which the switch 640 is open. In this instance, the switch 604 is switched only to the switch output 604(B) [phase control (PC)]; $F_s$ transforms the vector $Z_s=(Z_x,Z_y,Z_y,Z_q)$ into the single vector $Z_{s1}=(Z_{x1},Z_{y1},Z_{z1},Z_{q1})$. Details of the signal processing are described below.

First consider the configuration in which the switch 640 is closed. The solid lines represent the functional blocks to implement a second-order CCQL. The dotted lines represent additional functional blocks (in addition to those for the second-order CCQL) to implement a third-order CCQL. The second-order loop filter is described first; a description of the third-order loop filter then follows.

The input signal 411 $Z_s$ is inputted into the operator 602, which multiplies $Z_s$ by the coefficient $K_{1,sc}$. The output signal 603 ($K_{1,sc}Z_s$) is inputted into the switch 604, which has two output positions: switch output 604A for frequency control (FC) of the NCOs and switch output 604B for frequency and phase control (FPC) of the NCOs. For a second-order loop filter with FC operation, the switch 604 is switched to the switch output 604A, and the output signal 603 is inputted into the sum operator 606. The input signal 411 $Z_s$ is also inputted into the operator 620, which multiplies $Z_s$ by the coefficient $K_{2,sc}$. The output signal 621 ($K_{2,sc}Z_s$) is inputted into the accumulator 622, which accumulates the output signal 621. The output signal 623 (accumulated values of the output signal 621) is inputted into the sum operator 606. The output signal 605 (sum of output signal 603 and output signal 623) is inputted into the operator 608, which multiplies the output signal 605 by the value $1/T_{cc}$. The output signal 415 $Z_{s2}$ is outputted to the operator 408 (FIG. 4A).

For a second-order loop filter with FPC operation, the switch 604 is switched to the switch output 604B, and the output signal 603 is outputted as the output signal 413 $Z_{s1}$ to the operator 408 (FIG. 4A). The output signal 623 is inputted into the sum operator 606. Since the switch 604 is switched to the switch output 604B, the output signal 605 is the same as the output signal 623. The output signal 605 is then processed as described above in reference to FC operation. The output signal 415 $Z_{s2}$ is outputted to the operator 408 (FIG. 4A).

For a third-order loop filter with FC operation, the switch 604 is switched to the switch output 604A, and the output signal 603 is inputted into the sum operator 606. The input signal 411 $Z_s$ is also inputted into the operator 620, which multiplies $Z_s$ by the coefficient $K_{2,sc}$. The output signal 621 ($K_{2,sc}Z_s$) is inputted into the accumulator 622. The input signal 411 $Z_s$ is further inputted into the operator 630, which multiplies $Z_s$ by the coefficient $K_{3,sc}$. The output signal 631 ($K_{3,sc}Z_s$) is inputted into the accumulator 632. The output signal 633 (accumulated values of output signal 631) is inputted into the accumulator 622.

The output signal 623 (accumulated values of output signal 621 and output signal 633) is inputted into the sum operator 606. The output signal 605 (sum of output signal 603 and output signal 623) is inputted into the operator 608, which multiplies the output signal 605 by the value $1/T_{cc}$. The output signal 415 $Z_{s2}$ is outputted to the operator 408 (FIG. 4A).

For a third-order loop filter with FPC operation, the switch 604 is switched to the switch output 604B, and the output signal 413 $Z_{s1}$ is outputted to the operator 408 (FIG.

4A). The output signal 623 is inputted into the sum operator 606. Since the switch 604 is switched to the switch output 604B, the output signal 605 is the same as the output signal 623. The output signal 605 is then processed as described above in reference to the third-order loop filter with FC operation. The output signal 415 $Z_{s2}$ is outputted to the operator 408 (FIG. 4A).

Now consider the configuration in which the switch 640 is open and the switch 604 is switched to the switch output 604B. The phase control (PC) mode of a first-order CCQL is implemented. The input signal 411 $Z_s$ is inputted into the operator 602, which multiplies $Z_s$ by the coefficient $K_{1,sc}$, and the output signal 603 ($K_{1,sc}Z_s$) is outputted as the output signal 413 $Z_{s1}$ to the operator 408 (FIG. 4A).

Figure 8:
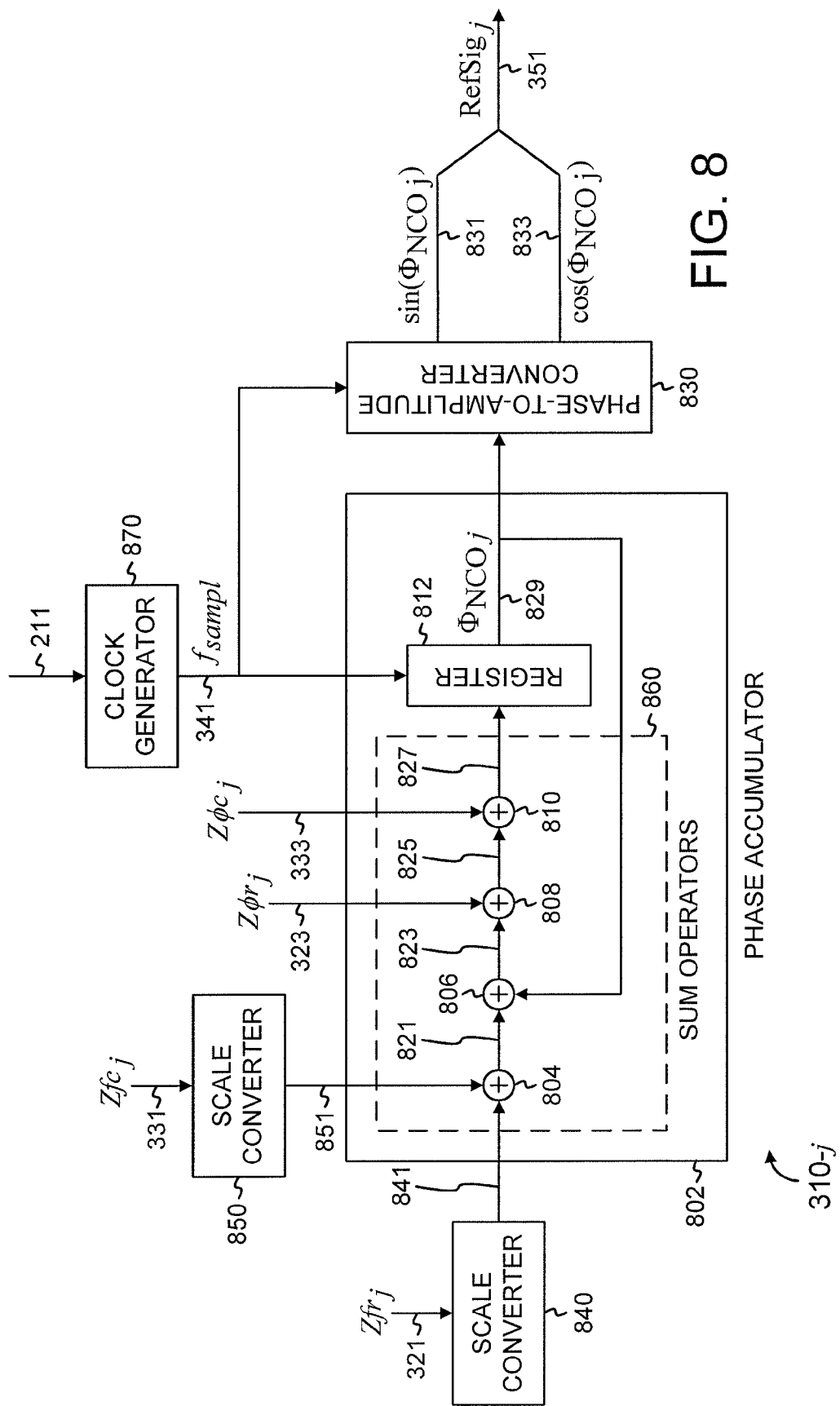
FIG. 8 shows a functional block diagram of a numerically-controlled oscillator.

FIG. 8 shows a schematic functional block diagram of a representative numerically-controlled oscillator (NCO). Shown is the NCO 310-j (NCO$_j$) for the j-th satellite channel (FIG. 3B). The NCO 310-j operates according to a clock with an update period of $T_{sampl}$; the update (sampling) frequency is $f_{sampl}=1/T_{sampl}$. The clock generator 870 receives the QCO reference signal 211 from the quartz crystal oscillator 708 (FIG. 7) and generates the clock signal 341 with a clock frequency of $f_{sampl}$. Each cycle of operation of the NCO 310-j occurs at a set of discrete time instants $t_s$; the period between consecutive time instants $t_s$ is the update period $T_{sampl}=t_{s,i+1}-t_{s,i}$, where is an arbitrary integer index. The NCO 310-j generates the output reference signal 351 (RefSig$_j$), which is inputted to the channel correlator 302-j (FIG. 3B). The RefSig$_j$ has the components $\cos(\Phi_{NCOj})$ and $\sin(\Phi_{NCOj})$.

The RefSig$_j$ has the following mathematical representation. Assume $A(t)$ represents a harmonic oscillation in which the amplitude has been normalized to one:

$$A(t)=\sin(2\pi f t), \quad (E26)$$

where
t is the time,
$f$ is the frequency, and
$\Phi=2\pi f t$ is the full phase of the harmonic oscillation.
The harmonic oscillation is a function with period of $2\pi$ and can be written as $$A(t)=\sin(2\pi f t)=\sin(2\pi f t-2\pi \cdot n), \quad (E27)$$

where n is an arbitrary integer number. Let $$n = E\left[\frac{2\pi f t}{2\pi}\right],$$

where E[x] is the integer part of x. Then $$\Phi_{NCO} = \left(2\pi f t - 2\pi \cdot E\left[\frac{2\pi f t}{2\pi}\right]\right) \quad (E28)$$
$$= FP\left[\frac{2\pi f t}{2\pi}\right],$$

where FP[x] is the fractional part of x. FP[$\Phi$] is referred to as the fractional part of the full phase $\Phi$. For the j-th satellite channel, $\Phi_{NCOj}$ is the fractional part of the full phase $\Phi_j$. The RefSig$_j$ then has the components $\cos(\Phi_{NCOj})$ and $\sin(\Phi_{NCOj})$.

The two principal components of the NCO 310-j are the phase accumulator 802 and the phase-to-amplitude converter 830. The phase accumulator 802 includes the sum operators 860 and the register 812. Various input values, described below, are summed in the sum operators 860. The output 827 of the sum operators 860 is recorded in the register 812 at the time instants $t_s$. Assume that time instants $t_s$ (and $t_{cr}$ and $t_{cc}$ below) are referenced to a common system clock. The output 829 of the register 812 at the time instant $t_s$ is the value $\Phi_{NCOj}$, which is inputted into the phase-to-amplitude converter 830, which then generates the value of the in-phase reference signal 833 $\cos(\Phi_{NCOj})$ and the value of the quadrature-phase reference signal 831 $\sin(\Phi_{NCOj})$, which are components of the RefSig$_j$ 351. To decrease computational load, the phase-to-amplitude converter 830 can include a lookup table, stored in read-only memory (ROM), of values of $\cos(\Phi_{NCOj})$ and $\sin(\Phi_{NCOj})$ as functions of $\Phi_{NCOj}$.

In the embodiment shown in FIG. 8, four input values are accumulated in the phase accumulator 802. In other embodiments, fewer than four input values are accumulated; for example, the CCQL discriminator 320(B) shown in FIG. 6 generates the common phase-control signal $Z\phi c_j$ but not the common frequency-control signal $Zfc_j$. The phase accumulator 802 receives the following inputs:

The individual channel frequency-control signal 321 $Zfr_j$. As described above in reference to FIG. 3B, FIG. 5A, and FIG. 5B, $Zfr_j$ is outputted from the individual loop filter 308-j. $Zfr_j$ is updated at time instants $t_{cr}$. The period between consecutive time instants $t_{cr}$ is the update period of $T_{cr}$; the update frequency is $f_{cr}=1/T_{cr}$. $Zfr_j$ represents a frequency in units of Hz (number of cycles per time period of one sec). $Zfr_j$ is first inputted into the scale converter 840; the output 841 represents a frequency in units of number of cycles per time period of $T_{sampl}$.

The individual channel phase-control signal 323 $Z\phi r_j$. As described above in reference to FIG. 3B, FIG. 5A, and FIG. 5B, $Z\phi r_j$ is outputted from the individual loop filter 308-j. $Z\phi r_j$ is updated at time instants $t_{cr}$. $Z\phi r_j$ represents a phase shift in units of number of cycles.

The common frequency-control signal 331 $Zfc_j$. As described above in reference to FIG. 3B and FIG. 4A, $Zfc_j$ is outputted from the CCQL discriminator 320. $Zfc_j$ is updated at time instants $t_{cc}$. The period between consecutive time instants $t_{cc}$ is the update period of $T_{cc}$; the update frequency is $f_{cc}=1/T_{cc}$ Hz). $Zfc_j$ represents a frequency in units of Hz (number of cycles per time period of one sec). $Zfc_j$ is first inputted into the scale converter 850; the output 851 represents a frequency in units of number of cycles per time period of $T_{sampl}$.

The common phase-control signal 333 $Z\phi c_j$. As described above in reference to FIG. 3B, FIG. 4A, and FIG. 4B, $Z\phi c_j$ is outputted from the CCQL discriminator 320. $Z\phi c_j$ is updated at time instants $t_{cc}$. $Z\phi c_j$ represents a phase shift in units of number of cycles.

The value of the (re-scaled) individual channel frequency-control signal 841 $Zfr_j$ is inputted into the sum operator 804 at every time instant $t_{cr}$; the most recent value of $Zfr_j$ is stored in the sum operator 804 until it is updated. The value of the (re-scaled) common frequency-control signal 851 $Zfc_j$ is inputted into the sum operator 804 at every time instant $t_{cc}$; the most recent value of $Zfc_j$ is stored in the sum operator 804 until it is updated.

The value of the individual channel phase-control signal 323 $Z\phi r_j$ is inputted into the sum operator 808 at every time instant $t_{cr}$. The value of $Z\phi r_j$ is not stored but is reset to zero until it is updated. The value of the common channel phase-control signal 333 $Z\phi c_j$ is inputted into the sum operator 810 at every time instant $t_{cc}$. The value of $Z\phi c_j$ is not stored but is reset to zero until it is updated.

The operation of the phase accumulator 802 proceeds as follows. To simplify the discussion, assume that the phase accumulator has already operated for a time t, where t>$T_{cr}$ and t>$T_{cc}$. At a particular time instant $t_{s,i}$, where i is an arbitrary integer index, the most recent value of the (re-scaled) individual channel frequency-control signal 841 $Zfr_j$ and the most recent value of the (re-scaled) common frequency-control signal 851 $Zfc_j$ are inputted into the sum operator 804. The sum 821 is inputted into the sum operator 806; the most recent value of the sum 821 is stored in the sum operator 806 and changes only when a new value of $Zfr_j$ or $Zfc_j$ is received. The value of $\Phi_{NCOj}$ outputted from the register 812 at the previous time instant $t_{s,i-1}$ is also inputted into the sum operator 806. The sum 823 is inputted into sum operator 808.

If $t_{s,i}$ coincides with a time instant $t_{cr}$, then the current value of the individual channel phase-control signal 323 $Z\phi r_j$ is inputted into the sum operator 808. If $t_{s,i}$ does not coincide with a time instant $t_{cr}$, then a value of zero is inputted into the sum operator 808. The sum 825 is inputted into the sum operator 810. If $t_{s,i}$ coincides with a time instant $t_{cc}$, then the current value of the common channel phase-control signal 333 $Z\phi c_j$ is inputted into the sum operator 810. If $t_{s,i}$ does not coincide with a time instant $t_{cc}$, then a value of zero is inputted into the sum operator 810. The sum 827 is then recorded in the register 812 to generate the phase.

The register 812, however, has a maximum value of $2\pi$ (1 cycle=$2\pi$); that is, the register 812 performs addition modulo $2\pi$. The value stored in the register at $t_{s,i}$ then does not correspond to the (cumulative) full phase but to the fractional part of the full phase: the output 829 of the register 812 is then $\Phi_{NCOj}$, which is then converted to the $RefSig_j$ 351, as described above.

The frequency shift of the quartz crystal oscillator caused by external effects (shock and vibration) has a stronger impact on the local oscillator frequency $f_{LO}$ than on clock frequencies, such as $f_{sampl}$. For example, typical values of various operating frequencies are the following:
 Quartz crystal oscillator frequency, $f_q$=$2\times10^7$ Hz.
 Received RF frequency, $f_{RF}$=$1.5\times10^9$ Hz.
 Local oscillator frequency, $f_{LO}$=$1.49\times10^9$ Hz.
 Intermediate frequency, $f_{IF}$=$1\times10^7$ Hz.
 Sampling frequency, $f_{sampl}$=$5\times10^7$ Hz.
Assume, due to external effects, such as heavy shock, that the shift in the quartz crystal oscillator frequency is 2 Hz. The resulting shift in the local oscillator frequency and the resulting shift in the intermediate frequency is 150 Hz, which is much wider than the PLL tracking bandwidth; consequently, tracking is lost. The resulting shift in the sampling frequency is 5 Hz and does not affect the tracking process.

Examples of mean values for signal generation frequencies (clock frequencies) are listed in Table 1 below.

TABLE 1

| Signals | Signal Generation Frequency |
| --- | --- |
| $I_j$, $Q_j$ | about 1000 Hz |
| $I_j^*$, $Q_j^*$ | about 200 Hz |
| $Zdr_j$ | about 200 Hz |
| $Zfr_j$, $Z\phi r_j$ | about 200 Hz |
| $f_{sampl}$ | from about 40 MHz to about 60 MHz |
| $Zfc_j$, $Z\phi c_j$ | from about 700 Hz to about 1000 Hz |

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for improving the performance of a navigation receiver operably coupled to an antenna, wherein the navigation receiver and the antenna are subjected to vibration and shock, and wherein the navigation receiver comprises a quartz crystal oscillator generating a quartz crystal oscillator signal having a quartz crystal oscillator frequency, the method comprising the steps of:
 receiving a plurality of navigation signals, wherein each individual navigation signal in the plurality of navigation signals corresponds to an individual global navigation satellite in a plurality of global navigation satellites, and wherein each individual navigation signal in the plurality of navigation signals has a corresponding radiofrequency;
 generating a local oscillator signal having a local oscillator frequency, wherein the local oscillator signal is based on the quartz crystal oscillator signal, and wherein the local oscillator frequency is based on the quartz crystal oscillator frequency;
 generating a plurality of intermediate signals based on the plurality of navigation signals and based on the local oscillator signal, wherein each individual intermediate signal in the plurality of intermediate signals corresponds to an individual navigation signal in the plurality of navigation signals, and wherein each individual intermediate signal in the plurality of intermediate signals has a corresponding intermediate frequency based on a difference between the corresponding radiofrequency and the local oscillator frequency;
 generating a plurality of sequences of digital signals, wherein each individual sequence of digital signals in the plurality of sequences of digital signals corresponds to a digital representation of an individual intermediate signal in the plurality of intermediate signals; and
 for each individual sequence of digital signals in the plurality of sequences of digital signals, tracking a phase of the individual sequence of digital signals with an individual channel phase-lock loop, wherein the step of tracking the phase of the individual sequence of digital signals with an individual channel phase-lock loop comprises the steps of:
  generating, with an individual channel correlator operating at a first clock frequency, a sequence of in-phase correlation signals and a sequence of quadrature-phase correlation signals, wherein the sequence of in-phase correlation signals and the sequence of quadrature-phase correlation signals are based on the sequence of individual digital signals and based on a sequence of individual channel reference signals received from an individual channel numerically-controlled oscillator;

generating, with a common coordinate-quartz loop discriminator operating at a second clock frequency, a sequence of common control signals;

generating, with an individual channel accumulator operating at a third clock frequency, a sequence of accumulated in-phase correlation signals and a sequence of accumulated quadrature-phase correlation signals, wherein the sequence of accumulated in-phase correlation signals is based on the sequence of in-phase correlation signals, and wherein the sequence of accumulated quadrature-phase correlation signals is based on the sequence of quadrature-phase correlation signals;

generating, with an individual channel discriminator operating at the third clock frequency, a sequence of phase-lock loop tracking error signals based on the sequence of accumulated in-phase correlation signals and based on the sequence of accumulated quadrature-phase correlation signals;

generating, with an individual channel loop filter operating at the third clock frequency, a sequence of individual channel control signals; and generating, with the individual channel numerically-controlled oscillator, wherein the individual channel numerically-controlled oscillator operates at a fourth clock frequency, the sequence of individual channel reference signals, wherein the sequence of individual channel reference signals is based on the sequence of common control signals and based on the sequence of individual channel control signals; and transmitting the sequence of individual channel reference signals to the individual channel correlator.

2. The method of claim 1, wherein:

the corresponding radiofrequency for each individual navigation signal in the plurality of navigation signals is the same radiofrequency; and the corresponding intermediate frequency for each individual intermediate signal in the plurality of intermediate signals is the same intermediate frequency.

3. The method of claim 1, wherein:

the corresponding radiofrequency for each individual navigation signal in the plurality of navigation signals is a different individual radiofrequency; and the corresponding intermediate frequency for each individual intermediate signal in the plurality of intermediate signals is a different individual intermediate frequency.

4. The method of claim 1, wherein the sequence of common control signals is selected from the group consisting of:

a sequence of common phase-control signals based on the sequences of in-phase correlation signals and the sequences of quadrature-phase correlation signals generated for all of the sequences of digital signals in the plurality of sequences of digital signals;

a sequence of common frequency-control signals based on the sequences of in-phase correlation signals and the sequences of quadrature-phase correlation signals generated for all of the sequences of digital signals in the plurality of sequences of digital signals; and a sequence of common phase-control signals and a sequence of common frequency-control signals, wherein the sequence of common phase-control signals and the sequence of common frequency-control signals are based on the sequences of in-phase correlation signals and the sequences of quadrature-phase correlation signals generated for all of the sequences of digital signals in the plurality of sequences of digital signals; and wherein the sequence of individual channel control signals is selected from the group consisting of:

a sequence of individual channel frequency-control signals based on the sequence of phase-lock loop tracking error signals;

a sequence of individual channel frequency-control signals and a sequence of individual channel phase-control signals, wherein the sequence of individual channel frequency-control signals and the sequence of individual channel phase-control signals are based on the sequence of phase-lock loop tracking error signals;

a sequence of individual channel frequency-control signals based on the sequence of phase-lock loop tracking error signals and based on the sequence of common phase-control signals; and a sequence of individual channel frequency-control signals and a sequence of individual channel phase-control signals, wherein the sequence of individual channel frequency-control signals is based on the sequence of phase-lock loop tracking error signals and based on the sequence of common phase-control signals, and wherein the sequence of individual channel phase-control signals is based on the sequence of phase-lock loop tracking error signals.

5. The method of claim 4, wherein the step of generating, with the individual channel numerically-controlled oscillator, wherein the individual channel numerically-controlled oscillator operates at a fourth clock frequency, the sequence of individual channel reference signals, wherein the sequence of individual channel reference signals is based on the sequence of common control signals and based on the sequence of individual control signals comprises:

the step of generating, with the individual channel numerically-controlled oscillator, wherein the individual channel numerically-controlled oscillator operates at the fourth clock frequency, the sequence of individual channel reference signals, wherein the sequence of individual channel reference signals is based on a sequence of control signals selected from the group consisting of:

the sequence of individual channel frequency-control signals and the sequence of common phase-control signals;

the sequence of individual channel frequency-control signals and the sequence of common frequency-control signals;

the sequence of individual channel frequency-control signals, the sequence of common phase-control signals, and the sequence of common frequency-control signals;

the sequence of individual channel frequency-control signals, the sequence of individual channel phase-control signals, and the sequence of common phase-control signals;

the sequence of individual channel frequency-control signals, the sequence of individual channel phase-control signals, and the sequence of common frequency-control signals; and the sequence of individual channel frequency-control signals, the sequence of individual channel phase-control signals, the sequence of common phase-control signals, and the sequence of common frequency-control signals.

6. The method of claim 1,
wherein the sequence of common control signals comprises:
a sequence of common phase-control signals based on the sequences of in-phase correlation signals and the sequences of quadrature-phase correlation signals generated for all of the sequences of digital signals in the plurality of sequences of digital signals;
wherein the sequence of individual channel control signals comprises:
a sequence of individual channel frequency-control signals based on the sequence of phase-lock loop tracking error signals; and
wherein the step of generating, with the individual channel numerically-controlled oscillator, wherein the individual channel numerically-controlled oscillator operates at a fourth clock frequency, the sequence of individual channel reference signals, wherein the sequence of individual channel reference signals is based on the sequence of common control signals and based on the sequence of individual control signals comprises:
the step of generating, with the individual channel numerically-controlled oscillator, wherein the individual channel numerically-controlled oscillator operates at the fourth clock frequency, the sequence of individual channel reference signals, wherein the sequence of individual channel reference signals is based on the sequence of common phase-control signals and based on the sequence of individual channel frequency-control signals.

7. The method of claim 1,
wherein the sequence of common control signals comprises:
a sequence of common phase-control signals based on the sequences of in-phase correlation signals and the sequences of quadrature-phase correlation signals generated for all of the sequences of digital signals in the plurality of sequences of digital signals;
wherein the sequence of individual channel control signals comprises:
a sequence of individual channel frequency-control signals and a sequence of individual channel phase-control signals, wherein the sequence of individual channel frequency-control signals is based on the sequence of phase-lock loop tracking error signals and based on the sequence of common phase-control signals, and wherein the sequence of individual channel phase-control signals is based on the sequence of phase-lock loop tracking error signals; and
wherein the step of generating, with the individual channel numerically-controlled oscillator, wherein the individual channel numerically-controlled oscillator operates at a fourth clock frequency, the sequence of individual channel reference signals, wherein the sequence of individual channel reference signals is based on the sequence of common control signals and based on the sequence of individual control signals comprises:
the step of generating, with the individual channel numerically-controlled oscillator, wherein the individual channel numerically-controlled oscillator operates at the fourth clock frequency, the sequence of individual channel reference signals, wherein the sequence of individual channel reference signals is based on the sequence of common phase-control signals, based on the sequence of individual channel frequency-control signals, and based on the sequence of individual channel phase-control signals.

8. The method of claim 1, wherein:
wherein the sequence of common control signals comprises:
a sequence of common phase-control signals and a sequence of common frequency-control signals, wherein the sequence of common phase-control signals and the sequence of common frequency-control signals are based on the sequences of in-phase correlation signals and the sequences of quadrature-phase correlation signals generated for all of the sequences of digital signals in the plurality of sequences of digital signals;
wherein the sequence of individual channel control signals comprises:
a sequence of individual channel frequency-control signals and a sequence of individual channel phase-control signals, wherein the sequence of individual channel frequency-control signals is based on the sequence of phase-lock loop tracking error signals and based on the sequence of common phase control signals, and wherein the sequence of individual channel phase-control signals is based on the sequence of phase-lock loop tracking error signals; and
wherein the step of generating, with the individual channel numerically-controlled oscillator, wherein the individual channel numerically-controlled oscillator operates at a fourth clock frequency, the sequence of individual channel reference signals, wherein the sequence of individual channel reference signals is based on the sequence of common control signals and based on the sequence of individual control signals comprises:
the step of generating, with the individual channel numerically-controlled oscillator, wherein the individual channel numerically-controlled oscillator operates at the fourth clock frequency, the sequence of individual channel reference signals, wherein the sequence of individual channel reference signals is based on the sequence of common phase-control signals, based on the sequence of common frequency-control signals, based on the sequence of individual channel phase-control signals, and based on the sequence of individual channel frequency-control signals.

9. A navigation receiver operably coupled to an antenna, the navigation receiver comprising:
a low-noise amplifier configured to receive a plurality of navigation signals, wherein each individual navigation signal in the plurality of navigation signals corresponds to an individual global navigation satellite in a plurality of global navigation satellites, and wherein each individual navigation signal in the plurality of navigation signals has a corresponding radiofrequency;
a quartz crystal oscillator configured to generate a quartz crystal oscillator signal having a quartz crystal oscillator frequency;
a local oscillator configured to generate a local oscillator signal having a local oscillator frequency, wherein the local oscillator signal is based on the quartz crystal oscillator signal, and wherein the local oscillator frequency is based on the quartz crystal oscillator frequency;

a radiofrequency mixer configured to generate a plurality of intermediate signals based on the plurality of navigation signals and based on the local oscillator signal, wherein each individual intermediate signal in the plurality of intermediate signals corresponds to an individual navigation signal in the plurality of navigation signals, and wherein each individual intermediate signal in the plurality of intermediate signals has a corresponding intermediate frequency based on a difference between the corresponding radiofrequency and the local oscillator frequency;

an analog-to-digital converter configured to generate a plurality of sequences of digital signals, wherein each individual sequence of digital signals in the plurality of sequences of digital signals corresponds to a digital representation of an individual intermediate signal in the plurality of intermediate signals; and a digital channel processing unit comprising:
  a plurality of individual channel correlators configured to operate at a first clock frequency;
  a common coordinate-quartz loop discriminator configured to operate at a second clock frequency;
  a plurality of individual channel accumulators configured to operate at a third clock frequency;
  a plurality of individual channel discriminators configured to operate at the third clock frequency;
  a plurality of individual channel loop filters configured to operate at the third clock frequency; and
  a plurality of individual channel numerically-controlled oscillators configured to operate at a fourth clock frequency;

wherein the digital processing unit is configured to receive, from the analog-to-digital converter, the plurality of sequences of digital signals; and wherein the digital processing unit is configured to, for each individual sequence of digital signals in the plurality of sequences of digital signals, perform the steps of:
  generating, with an individual channel correlator in the plurality of individual channel correlators, a sequence of in-phase correlation signals and a sequence of quadrature-phase correlation signals, wherein the sequence of in-phase correlation signals and the sequence of quadrature-phase correlation signals are based on the sequence of individual digital signals and based on a sequence of individual channel reference signals received from an individual channel numerically-controlled oscillator in the plurality of individual channel numerically-controlled oscillators;
  generating, with the common coordinate-quartz loop discriminator, a sequence of common control signals;
  generating, with an individual channel accumulator in the plurality of individual channel accumulators, a sequence of accumulated in-phase correlation signals and a sequence of accumulated quadrature-phase correlation signals, wherein the sequence of accumulated in-phase correlation signals is based on the sequence of in-phase correlation signals, and wherein the sequence of accumulated quadrature-phase correlation signals is based on the sequence of quadrature-phase correlation signals;
  generating, with an individual channel discriminator in the plurality of individual channel discriminators, a sequence of phase-lock loop tracking error signals based on the sequence of accumulated in-phase correlation signals and based on the sequence of accumulated quadrature-phase correlation signals;
  generating, with an individual channel loop filter in the plurality of individual channel loop filters, a sequence of individual channel control signals;
  generating, with the individual channel numerically-controlled oscillator, the sequence of individual channel reference signals, wherein the sequence of individual channel reference signals is based on the sequence of common control signals and based on the sequence of individual channel control signals; and
  transmitting the sequence of individual channel reference signals from the individual channel numerically-controlled oscillator to the individual channel correlator.

10. The navigation receiver of claim 9, wherein:
the corresponding radiofrequency for each individual navigation signal in the plurality of navigation signals is the same radiofrequency; and
the corresponding intermediate frequency for each individual intermediate signal in the plurality of intermediate signals is the same intermediate frequency.

11. The navigation receiver of claim 9, wherein:
the corresponding radiofrequency for each individual navigation signal in the plurality of navigation signals is a different individual radiofrequency; and
the corresponding intermediate frequency for each individual intermediate signal in the plurality of intermediate signals is a different individual intermediate frequency.

12. The navigation receiver of claim 9,
wherein the sequence of common control signals is selected from the group consisting of:
  a sequence of common phase-control signals based on the sequences of in-phase correlation signals and the sequences of quadrature-phase correlation signals generated for all of the sequences of digital signals in the plurality of sequences of digital signals;
  a sequence of common frequency-control signals based on the sequences of in-phase correlation signals and the sequences of quadrature-phase correlation signals generated for all of the sequences of digital signals in the plurality of sequences of digital signals; and
  a sequence of common phase-control signals and a sequence of common frequency-control signals, wherein the sequence of common phase-control signals and the sequence of common frequency-control signals are based on the sequences of in-phase correlation signals and the sequences of quadrature-phase correlation signals generated for all of the sequences of digital signals in the plurality of sequences of digital signals; and
wherein the sequence of individual channel control signals is selected from the group consisting of:
  a sequence of individual channel frequency-control signals based on the sequence of phase-lock loop tracking error signals;
  a sequence of individual channel frequency-control signals and a sequence of individual channel phase-control signals, wherein the sequence of individual channel frequency-control signals and the sequence of individual channel phase-control signals are based on the sequence of phase-lock loop tracking error signals;

a sequence of individual channel frequency-control signals based on the sequence of phase-lock loop tracking error signals and based on the sequence of common phase-control signals; and a sequence of individual channel frequency-control signals and a sequence of individual channel phase-control signals, wherein the sequence of individual channel frequency-control signals are based on the sequence of phase-lock loop tracking error signals and based on the sequence of common phase-control signals, and wherein the sequence of individual channel phase-control signals are based on the sequence of phase-lock loop tracking error signals.

13. The navigation receiver of claim 12, wherein the step of generating, with the individual channel numerically-controlled oscillator, the sequence of individual channel reference signals, wherein the sequence of individual channel reference signals is based on the sequence of common control signals and based on the sequence of individual control signals comprises:

the step of generating, with the individual channel numerically-controlled oscillator, the sequence of individual channel reference signals, wherein the sequence of individual channel reference signals is based on a sequence of control signals selected from the group consisting of:

the sequence of individual channel frequency-control signals and the sequence of common phase-control signals;

the sequence of individual channel frequency-control signals and the sequence of common frequency-control signals;

the sequence of individual channel frequency-control signals, the sequence of common phase-control signals, and the sequence of common frequency-control signals;

the sequence of individual channel frequency-control signals, the sequence of individual channel phase-control signals, and the sequence of common phase-control signals;

the sequence of individual channel frequency-control signals, the sequence of individual channel phase-control signals, and the sequence of common frequency-control signals; and the sequence of individual channel frequency-control signals, the sequence of individual channel phase-control signals, the sequence of common phase-control signals, and the sequence of common frequency-control signals.

14. The navigation receiver of claim 9, wherein the sequence of common control signals comprises:

a sequence of common phase-control signals based on the sequences of in-phase correlation signals and the sequences of quadrature-phase correlation signals generated for all of the sequences of digital signals in the plurality of sequences of digital signals;

wherein the sequence of individual channel control signals comprises:

a sequence of individual channel frequency-control signals based on the sequence of phase-lock loop tracking error signals; and wherein the step of generating, with the individual channel numerically-controlled oscillator, the sequence of individual channel reference signals, wherein the sequence of individual channel reference signals is based on the sequence of common control signals and based on the sequence of individual control signals comprises:

the step of generating, with the individual channel numerically-controlled oscillator, the sequence of individual channel reference signals, wherein the sequence of individual channel reference signals is based on the sequence of common phase-control signals and based on the sequence of individual channel frequency-control signals.

15. The navigation receiver of claim 9, wherein the sequence of common control signals comprises:

a sequence of common phase-control signals based on the sequences of in-phase correlation signals and the sequences of quadrature-phase correlation signals generated for all of the sequences of digital signals in the plurality of sequences of digital signals;

wherein the sequence of individual channel control signals comprises:

a sequence of individual channel frequency-control signals and a sequence of individual channel phase-control signals, wherein the sequence of individual channel frequency-control signals are based on the sequence of phase-lock loop tracking error signals and based on the sequence of common phase-control signals, and wherein the sequence of individual channel phase-control signals are based on the sequence of phase-lock loop tracking error signals; and wherein the step of generating, with the individual channel numerically-controlled oscillator, the sequence of individual channel reference signals, wherein the sequence of individual channel reference signals is based on the sequence of common control signals and based on the sequence of individual control signals comprises:

the step of generating, with the individual channel numerically-controlled oscillator, the sequence of individual channel reference signals, wherein the sequence of individual channel reference signals is based on the sequence of common phase-control signals, based on the sequence of individual channel frequency-control signals, and based on the sequence of individual channel phase-control signals.

16. The navigation receiver of claim 9, wherein the sequence of common control signals comprises:

a sequence of common phase-control signals and a sequence of common frequency-control signals, wherein the sequence of common phase-control signals and the sequence of common frequency-control signals are based on the sequences of in-phase correlation signals and the sequences of quadrature-phase correlation signals generated for all of the sequences of digital signals in the plurality of sequences of digital signals;

wherein the sequence of individual channel control signals comprises:

a sequence of individual channel frequency-control signals and a sequence of individual channel phase-control signals, wherein the sequence of individual channel frequency-control signals are based on the sequence of phase-lock loop tracking error signals and based on the sequence of common phase control signals, and wherein the sequence of individual channel phase-control signals are based on the sequence of phase-lock loop tracking error signals; and wherein the step of generating, with the individual channel numerically-controlled oscillator, the sequence of individual channel reference signals, wherein the sequence of individual channel reference signals is based on the sequence of common control signals and based on the sequence of individual control signals comprises:

the step of generating, with the individual channel numerically-controlled oscillator, the sequence of individual channel reference signals, wherein the sequence of individual channel reference signals is based on the sequence of common phase-control signals, based on the sequence of common frequency-control signals, based on the sequence of individual channel phase-control signals, and based on the sequence of individual channel frequency-control signals.

* * * * *

UNITED STATES PATENT AND TRADEMARK OFFICE
CERTIFICATE OF CORRECTION

PATENT NO. : 9,618,626 B2  
APPLICATION NO. : 14/357421  
DATED : April 11, 2017  
INVENTOR(S) : Andrey Vladimirovich Veitsel et al.

Page 1 of 1

It is certified that error appears in the above-identified patent and that said Letters Patent is hereby corrected as shown below:

In the Specification

In Column 13, Line 25, "$Z\theta r_j$ and the individual channel phase-control signal" should read --$Zfr_j$ and the individual channel phase-control signal--.

Signed and Sealed this  
Twenty-seventh Day of June, 2017

Joseph Matal  
*Performing the Functions and Duties of the*  
*Under Secretary of Commerce for Intellectual Property and*  
*Director of the United States Patent and Trademark Office*